United States Patent
Le Saint et al.

(10) Patent No.: US 10,601,818 B2
(45) Date of Patent: Mar. 24, 2020

(54) ENHANCED AUTHENTICATION BASED ON SECONDARY DEVICE INTERACTIONS

(71) Applicant: VISA INTERNATIONAL SERVICE ASSOCIATION, Foster City, CA (US)

(72) Inventors: Eric Le Saint, Los Altos, CA (US); Dominique Fedronic, Belmont, CA (US); Christian Aabye, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 222 days.

(21) Appl. No.: 15/551,499

(22) PCT Filed: Apr. 13, 2016

(86) PCT No.: PCT/US2016/027344
§ 371 (c)(1),
(2) Date: Aug. 16, 2017

(87) PCT Pub. No.: WO2016/168339
PCT Pub. Date: Oct. 20, 2016

(65) Prior Publication Data
US 2018/0026973 A1    Jan. 25, 2018

Related U.S. Application Data

(60) Provisional application No. 62/146,881, filed on Apr. 13, 2015.

(51) Int. Cl.
*H04L 29/06* (2006.01)
*H04L 9/32* (2006.01)
(Continued)

(52) U.S. Cl.
CPC .......... *H04L 63/0853* (2013.01); *G06F 21/35* (2013.01); *G06F 21/6218* (2013.01);
(Continued)

(58) Field of Classification Search
None
See application file for complete search history.

(56) References Cited

U.S. PATENT DOCUMENTS

| 6,363,485 | B1 | 3/2002 | Adams et al. |
| 7,146,009 | B2 | 12/2006 | Andivahis et al. |

(Continued)

FOREIGN PATENT DOCUMENTS

| EP | 2747335 A2 | 6/2014 |
| WO | 2013095434 A1 | 6/2013 |
| WO | 2015071707 A1 | 5/2015 |

OTHER PUBLICATIONS

Examination Report, dated Oct. 10, 2018, in EP. Application No. 16780658.7, 6 pages.
(Continued)

*Primary Examiner* — Joseph P Hirl
*Assistant Examiner* — Hassan Saadoun
(74) *Attorney, Agent, or Firm* — Kilpatrick Townsend & Stockton LLP

(57) ABSTRACT

Enhance authentication techniques may include receiving credential data of a secondary device by a primary device, generating a cryptogram using the credential data of the secondary device, and transmitting the cryptogram to an access device to request for authorization to use an account associated with a user of the primary device. The authorization can be granted based on verification of the cryptogram and an interaction activity pattern of interactions between the primary device and a set of communication devices including the secondary device.

19 Claims, 14 Drawing Sheets

(51) Int. Cl.
*H04L 9/08* (2006.01)
*G06F 21/62* (2013.01)
*G06Q 20/38* (2012.01)
*G06Q 20/40* (2012.01)
*H04W 12/06* (2009.01)
*G06F 21/35* (2013.01)
*G06Q 20/00* (2012.01)
*G06Q 20/28* (2012.01)
*G06Q 20/32* (2012.01)
*G06Q 20/18* (2012.01)
*H04L 9/14* (2006.01)

(52) U.S. Cl.
CPC ............ *G06Q 20/00* (2013.01); *G06Q 20/18* (2013.01); *G06Q 20/28* (2013.01); *G06Q 20/32* (2013.01); *G06Q 20/382* (2013.01); *G06Q 20/3821* (2013.01); *G06Q 20/38215* (2013.01); *G06Q 20/40* (2013.01); *G06Q 20/401* (2013.01); *H04L 9/0822* (2013.01); *H04L 9/0894* (2013.01); *H04L 9/14* (2013.01); *H04L 9/32* (2013.01); *H04L 9/321* (2013.01); *H04L 9/3231* (2013.01); *H04L 63/0428* (2013.01); *H04L 63/062* (2013.01); *H04L 63/08* (2013.01); *H04L 63/10* (2013.01); *H04W 12/06* (2013.01)

(56) References Cited

U.S. PATENT DOCUMENTS

| | | |
|---|---|---|
| 8,855,312 B1 | 10/2014 | Hodman et al. |
| 2006/0281409 A1* | 12/2006 | Levien .................. H04W 4/08 455/41.2 |
| 2007/0014400 A1 | 1/2007 | Wack et al. |
| 2008/0201577 A1 | 8/2008 | Tuliani |
| 2012/0060214 A1 | 3/2012 | Nahari |
| 2013/0006650 A1 | 1/2013 | Bocirnea et al. |
| 2013/0262317 A1 | 10/2013 | Collinge et al. |
| 2013/0268767 A1 | 10/2013 | Schrecker |
| 2013/0275308 A1 | 10/2013 | Paraskeva et al. |
| 2014/0278839 A1 | 9/2014 | Lynam et al. |
| 2014/0310182 A1 | 10/2014 | Cummins |
| 2018/0026787 A1* | 1/2018 | Le Saint ............... H04L 9/0841 713/155 |

OTHER PUBLICATIONS

Lee et al., "Communication-efficient three-party protocols for authentication and key agreement," Computer & Mathematics with Applications, Elsevier, Amsterdam, NL, vol. 58, No. 4, Aug. 1, 2009, pp. 641-648.

European Search Report, dated Jan. 19, 2018, in EP Application No. 16780658.7, 9 pages.

International Search Report and Written Opinion, dated Jul. 20, 2016, in PCT Application No. PCT/US2016/027344, 12 pages.

* cited by examiner

| TIME OF DAY 310 | DEVICE ID 320 | CONTEXTUAL DATA 340 |
|---|---|---|
| EARLY MORNING | MOBILE DEVICE ID<br>ACCESS POINT ID<br>FITNESS BAND ID | MB: LOCATION, APPLICATIONS USED, CALL LOG, MSG LOG<br>AP: LOCATION, NETWORK SPEED<br>FB: SPEED/ACCELERATION, HEART RATE, WORK PROGRAM SELECTION |
| MORNING | MOBILE DEVICE ID<br>FITNESS BAND ID<br>VEHICLE ID | MB: LOCATION, APPLICATIONS USED, CALL LOG, MSG LOG<br>FB: SPEED/ACCELERATION, HEART RATE<br>V: LOCATION, SPEED/ACCELERATION, FUEL ECONOMY |
| MIDDAY | MOBILE DEVICE ID<br>FITNESS BAND ID<br>LAPTOP ID<br>HEADSET ID | MB: LOCATION, APPLICATIONS USED, CALL LOG, MSG LOG<br>FB: SPEED/ACCELERATION, HEART RATE<br>LT: APPLICATIONS USED, WEB BROWSER HISTORY<br>HS: CALL LOG, VOLUME SETTING |
| AFTERNOON | MOBILE DEVICE ID<br>FITNESS BAND ID<br>VEHICLE ID | MB: LOCATION, APPLICATIONS USED, CALL LOG, MSG LOG<br>FB: SPEED/ACCELERATION, HEART RATE<br>V: LOCATION, SPEED/ACCELERATION, FUEL ECONOMY |
| EVENING | MOBILE DEVICE ID<br>ACCESS POINT ID<br>SPEAKER ID<br>TV ID<br>SMART APPLIANCE ID | MB: LOCATION, APPLICATIONS USED, CALL LOG, MSG LOG<br>AP: LOCATION, NETWORK SPEED<br>S: PLAYLIST, VOLUME SETTING<br>TV: CHANNELS VIEWED, VOLUME SETTING<br>SA: TEMPERATURE, HUMIDITY, ILLUMINANCE LEVEL |

FIG. 3

ENHANCED AUTHENTICATION BASED ON SECONDARY DEVICE INTERACTIONS

CROSS-REFERENCES TO RELATED APPLICATIONS

This application is a National Stage of International Application No. PCT/US2016/027344 filed Apr. 13, 2016, which claims priority from U.S. Provisional Patent Application No. 62/146,881, entitled "Enhanced Authentication Based on Secondary Device Interactions," filed Apr. 13, 2015, the entire contents of which are hereby incorporated by reference for all purposes.

BACKGROUND

Advances in communication technologies have allowed practically any type of device to be enabled with network connectivity. At the same time, the capabilities of both portable devices and home devices have also expanded to allow such devices to perform an ever increasing number of functionalities including security sensitive operations. Examples of security sensitive operations may include storing security sensitive information such as account credentials, and using the security sensitive information to access accounts of the user. Because of the networked connected nature of such devices, it has also become easy for unauthorized parties to gain access to such devices and the security sensitive information stored therein. As a result, there is a need to provide stronger authentication of such devices to ensure that a user operating a device is an authorized user of the device.

Embodiments of the present invention address these and other problems, individually and collectively.

BRIEF SUMMARY

Embodiments of the present invention provide enhanced authentication techniques to authenticate a communication device. In some embodiments, the user may operate the communication device to perform security sensitive functions. By providing a stronger authentication scheme to authenticate the communication device, the confidence that a user performing the security sensitive function via the communication device is an authorized user of the communication device can be increased. In some embodiments, the enhanced authentication techniques described herein leverage the interactions between the communication device and other devices that may communicate with the communication device. For example, recent interactions between the communication device and other devices can be compared with a historic interaction activity pattern to provide a risk assessment as to whether the communication device is being used in a manner that conforms to the typical behavior of the user. In some embodiments, the communication device can also leverage the interactions with other devices to securely store account credentials and/or to utilize the capabilities of other devices to performed cryptographic operations to authenticate the communication device.

According to some embodiments, the enhance authentication techniques may include receiving credential data of a secondary device by a primary device, generating a cryptogram using the credential data of the secondary device, and transmitting the cryptogram to an access device to request for authorization to use an account associated with a user of the primary device. The authorization can be granted based on verification of the cryptogram and an interaction activity pattern of interactions between the primary device and a set of communication devices including the secondary device.

According to some embodiments, the credential data of the secondary device may include a device identifier of the secondary device. The primary device may derive a key-encryption key using the device identifier of the secondary device and a shared key stored on the primary device, and decrypt an encrypted cryptogram key using the derived key-encryption key. The primary device may then generating the cryptogam by encrypting data pertaining to the request for authorization using the decrypted cryptogram key.

According to some embodiments, the credential data of the secondary device may include an intermediate cryptogram. The primary device may generate a first intermediate cryptogram using a first portion of a cryptogram key stored on the primary device, and transmit the first intermediate cryptogram to the secondary device. The secondary device may generate a second intermediate cryptogram (as the credential data) by using the first intermediate cryptogram and a second portion of the cryptogram key stored on the secondary device, and send the second intermediate cryptogram to the primary device. The primary device may then generate the final cryptogram by using the second intermediate cryptogram and the first portion of the cryptogram key stored on the primary device.

According to some embodiments, a communication device may include a processor and a memory storing computer readable instructions to implement the enhanced authentication techniques. The communication device can be a portable communication device or a network-connected communication device.

BRIEF DESCRIPTION OF THE DRAWINGS

FIG. 3 illustrates an example of an interaction activity pattern, according to some embodiments.

DETAILED DESCRIPTION

Figure 1:
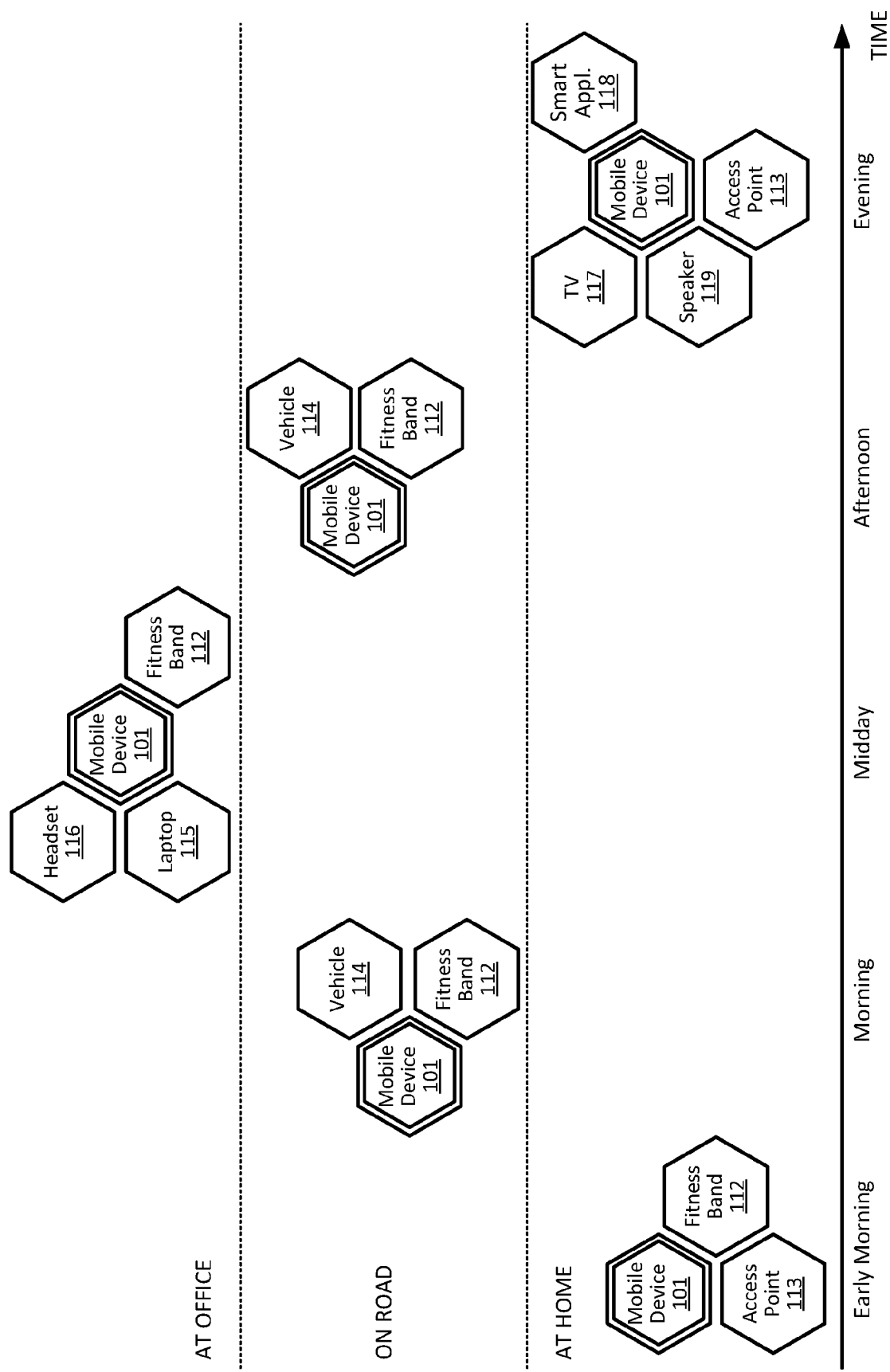
FIG. 1 illustrates a conceptual diagram of an example of communication devices that interact with each other, according to some embodiments.

Embodiments of the present invention provide enhanced authentication techniques to authenticate a communication device. In some embodiments, the user may operate the communication device to perform security sensitive functions. By providing a stronger authentication scheme to authenticate the communication device, the confidence that a user performing the security sensitive function via the communication device is an authorized user of the communication device can be increased. In some embodiments, the enhanced authentication techniques described herein leverage the interactions between the communication device and other devices that may communicate with the communication device. For example, recent interactions between the communication device and other devices can be compared with a historic interaction activity pattern to provide a risk assessment as to whether the communication device is being used in a manner that conforms to the typical behavior of the user. In some embodiments, the communication device can also leverage the interactions with other devices to securely store account credentials and/or to utilize the capabilities of the other devices to performed cryptographic operations to authenticate the communication device.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device that includes at least one processor coupled to a memory that stores instructions or code for execution by the processor. Examples of a communication device may include an access point, a router, a gateway, a networking hub, a desktop computer, a smart appliance (e.g., set-top box, smart TV, smart oven, smart thermostat, smart refrigerator, smart heater, home monitoring system, etc.), etc. Other examples of a communication device may include a portable communication device, or an accessory of a portable communication device (e.g., headset, earpiece, speaker, etc.).

A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness band, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "device identifier" may refer to a unique identifier for a communication device. A device identifier (ID) can be, for example, a serial number, a device alias, an Internet Protocol (IP) address, a media access control (MAC) address, a Mobile Subscriber Integrated Services Digital Network (MSISDN) number or other communication number associated with the communication device, International Mobile Subscriber Identity (IMSI) number, International Mobile Station Equipment Identity (IMEI) number, or other mutable or non-mutable device identification characters. In some embodiments, a device identifier can also be a requestor identifier (e.g., a token requestor identifier) that identifies the communication device to an authorization server. The requestor identifier can be generated by the authorization server, and assigned to the communication device by the authorization server.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer. In some embodiments, an issuer may refer to a provider of a software application.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for interacting with a communication device and for communicating with an authorization server. In some embodiments, an access device may communicate with an authorization server via a merchant computer or transaction processing network. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites or web servers, and the like. An access device may use any suitable contact or contactless, wired or wireless mode of operation to send or receive data from, or associated with, a communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be format-preserving and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited-use key" or "LUK" may refer to a key that can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds may include at least one of a number of transactions that the LUK can be used for, a time-to-live indicating the duration of time for which the LUK is valid, and/or a cumulative transaction amount indicating the total transaction amount summed across one or more transactions for which the LUK is valid, or any combination thereof.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of some embodiments of the present invention will now be described.

I. Interaction Activity Pattern

A user of a communication device will typical develop a behavioral pattern of operating the communication device and using the communication device to interact with other communication devices. For example, a user may develop a pattern of using a smart phone to check the user's schedule every morning when the user wakes up. A user may also develop a pattern of connecting the smart phone to a wireless speaker to play music around dinner time each evening. Such behavioral pattern of how the communication device is operated and how the communication device interacts with other devices can be tracked over time to establish an interaction activity pattern of the communication device.

FIG. 1 illustrates a conceptual diagram of an example of communication devices that interact with each other during the course of a day, according to some embodiments. The example shown in FIG. 1 is illustrated from the perspective of a mobile device 101 (e.g., smartphone) that the user carries with him/her throughout the day. In this example, mobile device 101 can acts as a communication hub that interacts with various other devices. Mobile device 101 may interact with a different communication device at different times, and/or simultaneously interact with more than one communication device at a time.

Referring to FIG. 1, in the early morning when the user wakes up at home, the user may operate mobile device 101 to connected to a wireless access point 113 to use the home's WiFi data connectivity, for example, to synchronize the calendar on mobile device 101 with a remote server and to check the user's schedule for the day. The user may also put on a fitness band 112, and turn on fitness band 112. Fitness band 112 may establish a communication channel with mobile device 101 such that the user can use mobile device 101 as a user interface to select a workout program configured on the fitness band 112 and to enable fitness band 112 to transmit health monitoring data such as the user's heart rate to mobile device 101.

Later in the morning after the user has completed the morning workout, the user may leave the user's home and commute to work. As the user leaves the home and enter the user's vehicle 114, mobile device 101 may disconnect from the home's wireless access point 113 and establish a new connection with vehicle 114, for example, to allow the user to place calls from vehicle 114 while the user is driving, or to stream music from mobile device 101 to the audio system of vehicle 114. Mobile device 101 may also periodically or continuously establish connectivity to fitness band 112 to obtain health monitoring data if the user wears fitness band 112 throughout the day.

When the user arrives at the office, mobile device 101 may disconnect from vehicle 114. At midday when the user is in the office, mobile device 101 may connect to an office laptop 115 to synchronize mobile device 101 to laptop 115. Mobile device 101 may also connect to an office headset 116 to allow the user to conduct hand-free calls in the office. Meanwhile, mobile device 101 may periodically or continuously establish connectivity to fitness band 112 to obtain health monitoring data of the user. In the afternoon when the user leaves the office to go home, mobile device 101 may disconnect from laptop 115 and headset 116. Mobile device 101 may reestablish connectivity to vehicle 114 as the user drives home.

When the user arrives home, mobile device 101 may disconnect from vehicle 114. Mobile device 101 may also disconnect from fitness band 112 when the user removes fitness band 112. During the evening when the user is at home, mobile device 101 may reestablish connection to access point 113 to use the home's Internet data connectivity. Mobile device 101 may also connect to wireless speaker 119 to stream music to speaker 119, and to TV 117 to play videos on TV 117. Mobile device 101 may also connect to a smart appliance 118 such as a smart thermostat to adjust the temperature at home.

Figure 2:
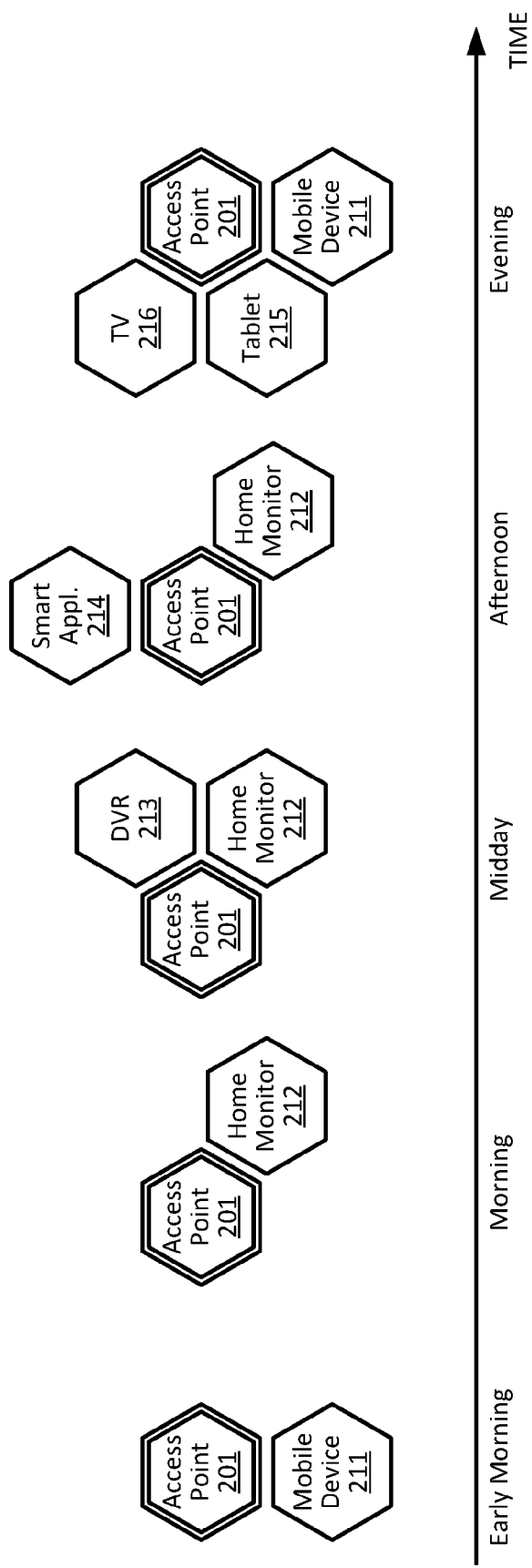
FIG. 2 illustrates a conceptual diagram of another example of communication devices that interact with each other, according to some embodiments.

FIG. 2 illustrates a conceptual diagram of another example of communication devices that interact with each other during the course of a day, according to some embodiments. The example shown in FIG. 2 is illustrated from the perspective of an access point 201 (e.g., an Internet gateway or router) installed at a user's home. In this example, access point 201 can acts as a communication hub to interact with various other devices. Access point 101 may interact with a different communication device at different times, and/or simultaneously interact with more than one communication device at a time.

In the early morning when the user wakes up at home, the user may operate mobile device 211 to connected to wireless access point 201 similar to the example of FIG. 1. Later in the morning when the user leaves for work, access point 201 may disconnect from mobile device 211 and establish connection to a home monitoring system 212 to allow the user to monitor the home remotely. During midday and while still connected to home monitoring system 212, access point 201 may connect to a DVR 213 to start recording a program when the user is not home. In the afternoon, access point 201 may disconnect from DVR 213 after the recorded program has finished, and connect to a smart appliance 214 such as a smart thermostat to preheat the home before the user gets home from work. In the evening when the user is back home, access point 201 may disconnect from home monitoring system 212. The user may also connect access point 212 to various devices that uses access point 201 for data connectivity such as the user's mobile device 211, tablet 216, and TV 215.

As these examples illustrate, whether a communication device is a portable communication device such as mobile device 101, or a network-connected communication device such as access point 201, a communication device acting as a primary device can interact with any number of other devices during the course of a day. As a user's daily routine is not expected to change much from day to day, the interactions between communication devices of the user throughout the day can be collected to establish an interaction activity pattern representing the typical behavior of the user and/or the user's communication device. This interaction activity pattern can be learned over time, and can be used as a digital persona to authenticate the user and the communication devices of the user as discussed further below.

FIG. 3 illustrates an example of an interaction activity pattern 300 of the interactions between communication devices of a user, according to some embodiments. The example of interaction activity pattern 300 shown in FIG. 3 is based on the device interactions illustrated in FIG. 1 in which the mobile device of the user is acting as a communication hub. Interaction activity pattern 300 may provide a correlation between each time period of the day (e.g., early morning, morning, midday, afternoon, evening, etc.) and device data associated with the communication devices that interacted with each other during the particular time period. Although the time of day 310 shown in FIG. 3 is divided into five different time periods, it should be understood that in some embodiments, a finer granularity of time periods (e.g., each hour of the day representing a time period) or a coarser granularity of time periods (e.g., morning, day, and night) can be used.

In the most basic form, interaction activity pattern 300 may include correlations between the time of day 310 and device identifiers (IDs) 320 of the communication devices that interacted with the user's mobile device during the different time periods of the day. For example, in the early morning, the mobile device of the user may interact with the user's home access point and fitness band. As such, interaction activity pattern 300 may associate the device IDs of the mobile device, the access point, and the fitness band with the early morning time period. Similarly, in the evening, the mobile device of the user may interact with the user's home access point, wireless speaker, TV, and smart appliance. As such, interaction activity pattern 300 may associate the device IDs of the mobile device, the access point, wireless speaker, TV, and smart appliance with the evening time period.

In some embodiments, in addition to correlating device IDs, interaction activity pattern 300 may include correlations between the time of day 310 and additional device data available from the communication devices. For example, interaction activity pattern 300 may include correlations between the time of day 310 and contextual data 340 available from any of the communication devices. In some embodiments, contextual data 340 may include sensor data such as environmental data and/or performance or status data provided by one or more sensors of a device. Additionally or alternatively, contextual data 340 may include user data representing how the user interacts with a communication device during each time period. For example, user data may include user input received by a device during the particular time period (e.g., buttons pressed by the user, keyboard or keypad entry of the user, etc.). User data may also include functionalities of a device invoked by the user during the particular time period (e.g., applications invoked by the user, operational and/or configuration changes made by the user, activities performed by the user using the device, etc.).

Referring to FIG. 3, the mobile device of the user may provide contextual data such as the location of the mobile device, applications on the mobile device used by the user, a phone call log, and/or a text message log. The contextual data of the mobile device during each time period in the time of day 310 can be correlated with the corresponding time period in interaction activity pattern 300. Regarding the other communication devices, in the early morning time period, the mobile device interacts with the fitness band and access point. The fitness band may provide contextual data such as speed/acceleration data and heart rate data, as well as a workout program selected by the user. The access point may provide contextual data such as location and network speed data. These contextual data from the fitness band and access point can be correlated with the early morning time period as part of interaction activity pattern 300.

As another example, during the midday time period, the user's laptop in the office may provide contextual data in the form of applications on the laptop used by the user, and a web browser history. The headset of the user may provide contextual data in the form of a call log and volume setting set by the user. These contextual data from the laptop and headset can be correlated with the midday time period as part of interaction activity pattern 300. Similarly, in the evening time period, contextual data such as the playlist and volume setting of the wireless speaker, the channels viewed and volume setting of the TV, and the temperature, humidity, and illuminance level detected by the smart appliance thermostat can be correlated with the evening time period as part of interaction activity pattern 300.

According to some embodiments, the device data (e.g., device ID, contextual data such as sensor data and/or user data, etc.) of the communication devices can be sent to an authorization server to establish an interaction activity pattern at the authorization server. During the course of the day, a communication hub device such as a mobile device, access point, etc. (may be referred to as a "primary device") may periodically send device data to the authorization server. The primary device may have cryptographic capabilities to communicate with the authorization server using end-to-end encryption. In some embodiments, the end-to-end encryption can be achieved using a protocol such as Opacity that does not require handshaking between the primary device and the authorization server to establish a secure communication channel.

In addition, during the course of the day as the primary device interacts with other communication devices (may be referred to as "secondary devices") and establishes a communication channel with each secondary device, the primary device may receive the device ID of the secondary device. The device ID can be received as part of the protocol to establish the communication channel with the secondary device, or in response to the primary device requesting the device ID from the secondary device. The primary device may send its own device ID, the received device ID of the secondary device, and a timestamp indicating when the primary device interacted with the secondary device to the authorization server (e.g., using end-to-end encryption) to establish the interaction activity pattern. In some embodiments, if the primary device sends the device ID of the secondary device as the primary device receives them (e.g., in substantially real-time), the timestamp can be omitted because the authorization server can determine on its own as to when the primary device interacted with the secondary device (e.g., based on when the authorization server receives the device ID).

In embodiments in which the interaction activity pattern includes contextual data such as sensor data and/or user data of a secondary device, the primary device may receive the sensor data and/or user data from the secondary device as part of the normal interaction with the secondary device. In some embodiments, the primary device may request the sensor data and/or user data from the secondary device. The primary device may send its own contextual data as well as the sensor data and/or user data from the secondary device to the authorization server in a similar manner as the device ID described above. In some embodiments, the primary device may periodically poll each secondary device for the device data associated with the secondary device (e.g., device ID, sensor data, and/or user data), and send the device data to the authorization server according to a predetermined schedule. In some embodiments, if a secondary device has its own cryptographic capabilities to communicate with the authorization server using end-to-end encryption, the secondary device itself may send its device data to the authorization server.

In some embodiments, location data provided from the primary and secondary devices can also be used by the authorization server to derive a geographic perimeter representing a geo-fence around the location of the user throughout the day. For example, the geographic perimeter can be derived by using the locations reported by the devices to extrapolate a route taken by the user, and setting the perimeter's boundary at a predetermined distance around the extrapolated route. This geographic perimeter can provide an indication of where a user is likely to be at during each time period of the day, and the geographic perimeter information can be included as part of the interaction activity pattern associated with the user's communication device.

Although a user's routine will generally remain the same from day to day, there can be anomalies and circumstances from time to time that may cause the user to deviate from his/her usual routine. As such, the authorization serve can analyze the device data of the primary device and secondary devices over time and filter out any discrepancies that deviates from the user's typical behavior when establishing the interaction activity pattern. For example, the raw device data from each day can be compared with previous days, and only the common device data or device data that has been consistent for over a threshold number of days may be used as the interaction activity pattern. In some embodiments, the authorization server may maintain a separate interaction activity pattern for each day of the week to account for differences in the user's behavior between each day, or between weekdays and weekends. Once the interaction activity pattern based on interactions between communication devices of a user has been learned by the authorization server, the authorization server can utilize the interaction activity pattern to provide enhance authentication for the user and his/her communication devices. In some embodiments, the authorization server may also analyze trends in correlations between the device data and the different time periods to account for shifts in the user's behavior over time, and adjust or update the interaction activity pattern accordingly.

II. Interaction Activity Pattern Based Authentication

Figure 4A:
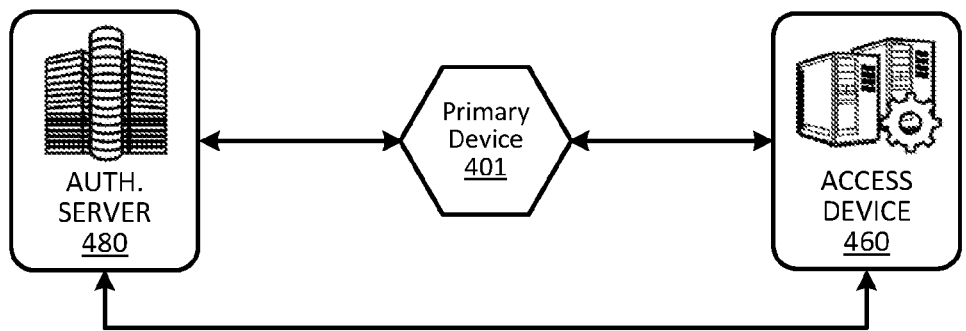
FIG. 4A illustrates a scenario of a communication device interacting with an access device, according to some embodiments.
Figure 4B:
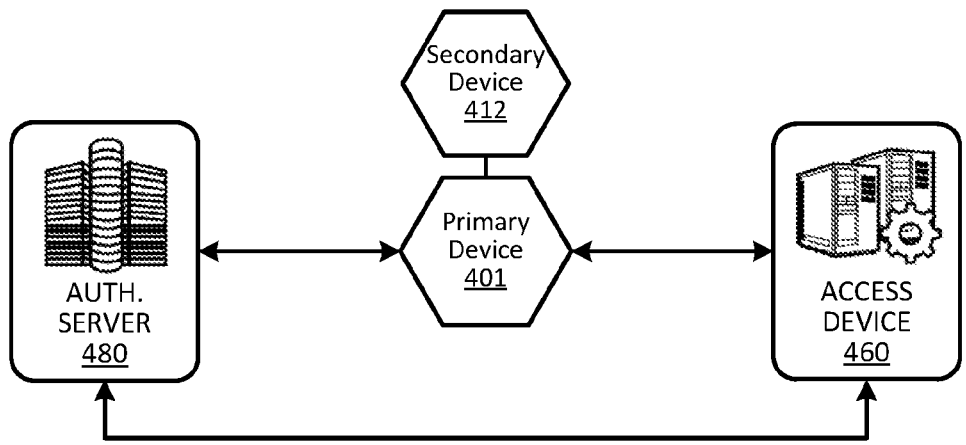
FIG. 4B illustrates a scenario of two communication devices cooperatively interacting with an access device, according to some embodiments.
Figure 4C:
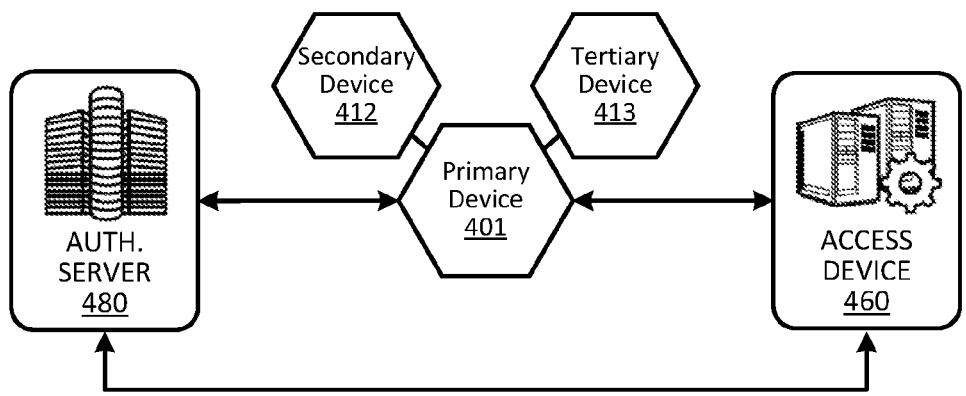
FIG. 4C illustrates a scenario of three communication devices cooperatively interacting with an access device, according to some embodiments.

FIGS. 4A-4C illustrate different scenarios in which the interaction activity pattern can be used to provide enhanced authentication services for a user and his/her communication devices.

Referring to FIG. 4A, a user may operate a primary device 401 to communicate with an access device 460 to perform a security sensitive operation such as requesting authorization to use an account associated with a user of the primary device 401. In this scenario, primary device 401 is acting as a requestor device with the capabilities to interact with access device 460 to request authorization to use the account associated with the user. For example, primary device 401 may have a compatible application and compatible communication hardware to interact with access device 460. Access device 460 can be, for example, a remote web server or a POS terminal in proximity to primary device 401. To request authorization to use an account associated with a user, primary device 401 may provide a token or an account identifier to access device 460. If the token or account identifier is not unique to primary device 401 (e.g., the same token or account identifier are provisioned to other devices), primary device 401 may also provide a device ID to access device 460 such that primary device 401 can be identified. Access device 460 may forward the token or account identifier (and device ID if provided) to authorization server 480. Authorization server 480 may determine the user's account based on the token or account identifier, device ID of the primary device 401 (e.g., as forwarded by access device 460, or determined from the token or account identifier if unique to primary device 401), and retrieve the interaction activity pattern associated with the primary device 401.

In embodiments in which the primary device 401 that sends device data to authorization server 480, authorization server 480 may compare recent device data received from primary device 401 against the interaction activity pattern to assess the risk of whether the primary device 401 is being operated by its authorized user. For example, if the recent device data (e.g., device IDs and/or contextual data) received from primary device 401 is similar to the historic interaction activity pattern for the time of day, then the confidence that primary device 401 is being operated by its authorized user would be high, and authorization server 480 may grant authorization to use the user's account.

In embodiments in which primary device does not normally send device data directly to authorization server 480, authorization server 480 can compare the device ID of primary device 401 against the historic interaction activity pattern to determine if the user typically interacts with or uses primary device 401 during this time of the day, and/or if primary device 401 is being used at a location within the geographic perimeter of where the user is expected to be at this time of the day. If the use of primary device 401 is consistent with the interaction activity pattern, authorization server 480 may grant the authorization to use the user's account. In some embodiments, primary device 401 may also provide contextual data (e.g., sensor data and/or user data of primary device 401) to access device 460, and access device 460 may forward the contextual data to authorization server 480. The contextual data of primary device 401 can also be considered when authorization server 480 assesses the risk of whether primary device 401 is being operated by its authorized user.

If authorization server 480 determines that the recent device data received from primary device 401 is not consistent the interaction activity pattern, or that primary device 401 is being used in a manner deviating from the interaction activity pattern, authorization sever 480 may decline the authorization request. In some embodiment, instead of declining the authorization request, authorization may still be granted if additional data is available to increase the confidence that the user using requestor device 401 is an authorized user.

FIG. 4B illustrates a scenario in which an additional communication device (may be referred to as a "secondary device") is used to increase the confidence that the user using primary device 401 is an authorized user, according to some embodiments. In FIG. 4B, a user may be operating primary device 401 in the presence of an additional communication device that has previously been registered with authorization server 480. The additional communication device can be a secondary device 412 acting as a credential device that provides credential data to primary device 401. In some embodiments, if secondary device 412 is a wearable device with a biometric or activity sensor (e.g., heart rate monitor) that can be used to establish continuous presence of the user, the addition credential data provided to primary device 401 can be a stream of activity or biometric patterns (e.g., heart rate data). The stream of activity or biometric pattern from the previously registered secondary device 412 can increase the confidence that the user is an authorized user, because the stream of activity or biometric pattern can be used to established the identity of the user and/or that the user of primary device 401 is in possession of two devices associated with the account holder.

FIG. 4C illustrates another scenario in which an additional communication device is used to increase the confidence that the user using primary device 401 is an authorized user, according to some embodiments. The scenario in FIG. 4C is similar to that of FIG. 4B except that a third communication device (may be referred to as a "tertiary device") previously registered with authorization server 480 is acting as a user interface device to control or instruct primary device 401. In FIG. 4C, the user is initiating the request for authorization to use the account associated with the user from tertiary device 413 instead of primary device 401. When the user initiates the request on tertiary device 413, tertiary device 413 establishes a connection to primary device 401 (if not already established), and instructs primary device 401 to send the request for authorization to access device 460. Tertiary device 413 can be used, for example, to provide an alternative user interface that what is available on primary device 401, when it is more convenient for the user to physically interact with tertiary device 412, or if the primary device 401 does not have its own user interface. The presence of the third communication device further increases the confidence that the user is an authorized user because the user is in possession of three devices associated with the account holder.

As the example in FIG. 4C illustrates, the roles and functionalities to request authorization to use an account can be distributed amongst multiple communication devices associated with a user. In some embodiments, depending on the capabilities of the communication device, the communication device can perform multiple functions and serve different roles at different times. For example, in one scenario, a smartphone can be used as the primary requestor device with a fitness band being used as a secondary credential device. In another scenario, a smartwatch can be used as the primary requestor device with a smartphone being uses as a secondary credential device, or vice versa. In a further scenario, a smartwatch can be used as a tertiary user interface device controlling a smartphone acting as a primary requestor device with the user's vehicle acting as a second credential device. Thus, it should be understood that although a particular communication device may be referred to as a primary device, a secondary device, or a tertiary device, the same communication device can server different roles at different times. In other words, a particular communication device can act as any combination of one or more primary, secondary, or tertiary devices, and may provide any combination of one or more requestor, credential, or user interface functionalities.

III. Enhanced Authentication Using Secondary Device Assisted Credential Storage

In the scenarios shown in FIGS. 4B and 4C above, a secondary device is used to provide an indication of user presence to increase the confidence that the request to use an account is from an authorized user. In some embodiments, a secondary device can provide enhanced authentication by facilitating secure account credential storage for a primary device. For example, device data of a secondary device can be used to encrypt account credentials. The encrypted account credentials can be stored encrypted on the primary device or on the secondary device, or be split and stored on both the primary and secondary devices. When the primary device communicates with an access device to request authorization to use an account, the primary device may obtain the device data of the secondary device (and any account credential stored on the secondary device). The primary device can then use the device data of the secondary device to decrypt the account credentials, and use the decrypted account credentials to interact with the access device to request authorization to use the account.

Figure 5:
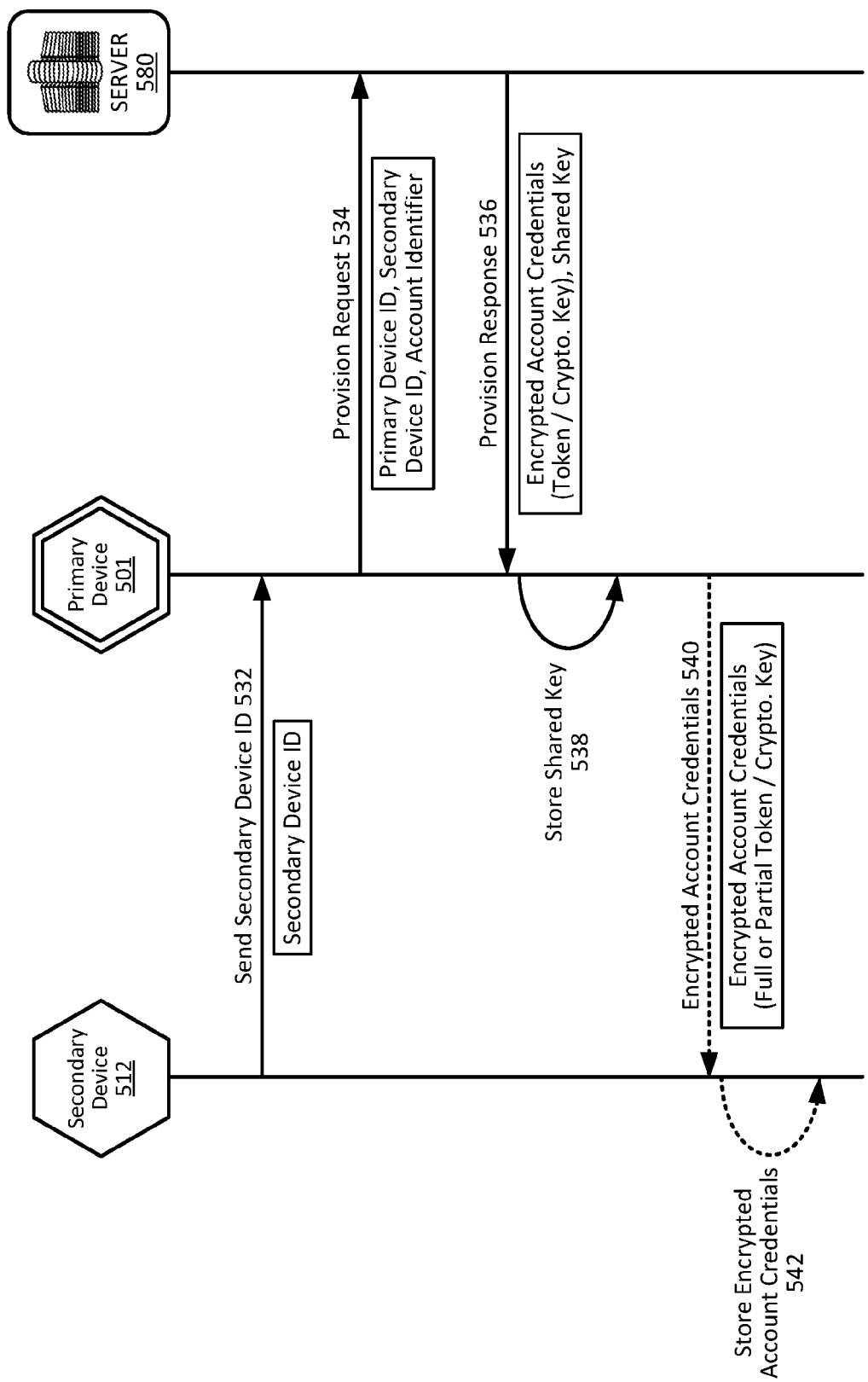
FIG. 5 illustrates a communication flow diagram of a provisioning process for secondary device assisted credential storage, according to some embodiments.

FIG. 5 illustrates a communication flow diagram of a provisioning process to provision account credentials to a primary device interacting with a secondary device for assisted secure storage authentication, according to some embodiments. Primary device 501 may establish a communication channel with secondary device 512 to communicate with secondary device 512. The communication channel may use end-to-end encryption to protect the information exchanged between the devices if secondary device 512 has cryptographic capabilities. If the secondary device 512 lacks cryptographic capabilities, the communication channel between primary device 501 and secondary device 512 can employ obfuscation techniques to protect the information exchanged between the devices. In some embodiments, the communications between the primary and secondary devices can be digitally signed by the corresponding device. The communication channel between primary device 501 and authentication server 580 can employ end-to-end encryption, for example, using a protocol such as Opacity that does not require handshaking between the primary device and the authorization server to establish a secure communication channel.

At step 532, secondary device 512 may send device data of secondary device 512 such as a device ID to primary device 501. The device data can be received as part of the process to establish the communication channel between primary device 501 and secondary device 512, or in response to primary device 501 requesting the device data from secondary device 512. At step 534, primary device 501 may send a provision request to authorization server 580 to request account credentials for an account of the user. In some embodiments, authorization server 580 can be a token server that manages and provisions tokens to communication devices. The provision request may include the device ID of primary device 501, an account identifier to identify the account for which the account credentials are being requested, and device data such as the device ID of secondary device 512.

When authentication server 580 receives the provision request, authentication server 580 may verify that the account is in good standing. If the account is in good standing, authentication server 580 can generate a shared key for primary device 501 and account credentials for the account. In some embodiments, the shared key can be generated using a protocol such as elliptic curve Diffie-Hellman. The account credentials may include a token that can be used as a substitute for the account identifier and/or a cryptogram key that can be used by primary device to generate a cryptogram when requesting authorization to use the account. In some embodiments, the cryptogram key can be a limited-use key that is associated with a set of one or more limited-use thresholds. When usage of the limited-use key has exceed its one or more limited-use thresholds, the limited-use key and the cryptograms generated with the limited-use key will no longer be valid, and a new limited-use key should be replenished from authentication server 580.

Once the shared key and account credentials are generated, authentication server 580 may then generate a key-encryption key from the shared key and device data of secondary device 512. For example, the key-encryption key can be generated by encrypting the device data (e.g., device ID) of secondary device 512 using the shared key. Authentication server 580 may then encrypt the generated account credentials (e.g., token and/or cryptogram key) using the key-encryption key.

At step 536, authentication server 580 sends the encrypted account credentials and the shared key associated with primary device 501 to primary device 501. At step 538, primary device 501 stores the shared key on primary device 501. In some embodiments, primary device 501 may also store the encrypted account credentials, or part of the encrypted account credentials (e.g., only the encrypted token, only the encrypted cryptogram key, a portion of the encrypted token, a portion of the encrypted cryptogram key, or portions of both) on primary device 501. At step 540, any part of the encrypted account credentials that is not being stored on primary device 501 is sent to secondary device 512. At step 542, secondary device 512 stores the encrypted account credentials (e.g., full or partial) received from primary device 501 on secondary device 512. After the provisioning process is complete, primary device 501 removes the device data (e.g., device ID) of secondary device 512 from the memory of primary device 501. In some embodiments, if secondary device 512 can communicate with authentication server 580 directly, instead of using primary device 501 to forward to secondary device 512 the portion of account credentials to be stored on secondary device 512 (if any), authentication server 580 may send the portion of the account credentials to be stored on secondary device 512 directly to secondary device 512, and may omit sending that portion of the account credentials to primary device 501.

In some embodiments, secondary device 512 can be provisioned asynchronously from primary device 501. In other words, secondary device 512 can be provisioned at a different time than when primary device 501 is provisioned. For example, primary device 501 may store the device data received from secondary device 512, and send the provision request to authorization server 580 at a later time when primary device 701 is no longer communicatively connected to secondary device 712. Primary device 501 may also store the account credentials received from authorization server 580 intended for storage on secondary device 512 until primary device 501 re-establishes connectivity to secondary device 512 at a later time. In some embodiments, authorization server 580 may provision secondary device 512 independently and separately from primary device 501. Hence, in some embodiments, secondary device 512 can be provisioned without requiring an active connection to primary device 501 when primary device 501 sends the provision request to authorization server 580.

Figure 6:
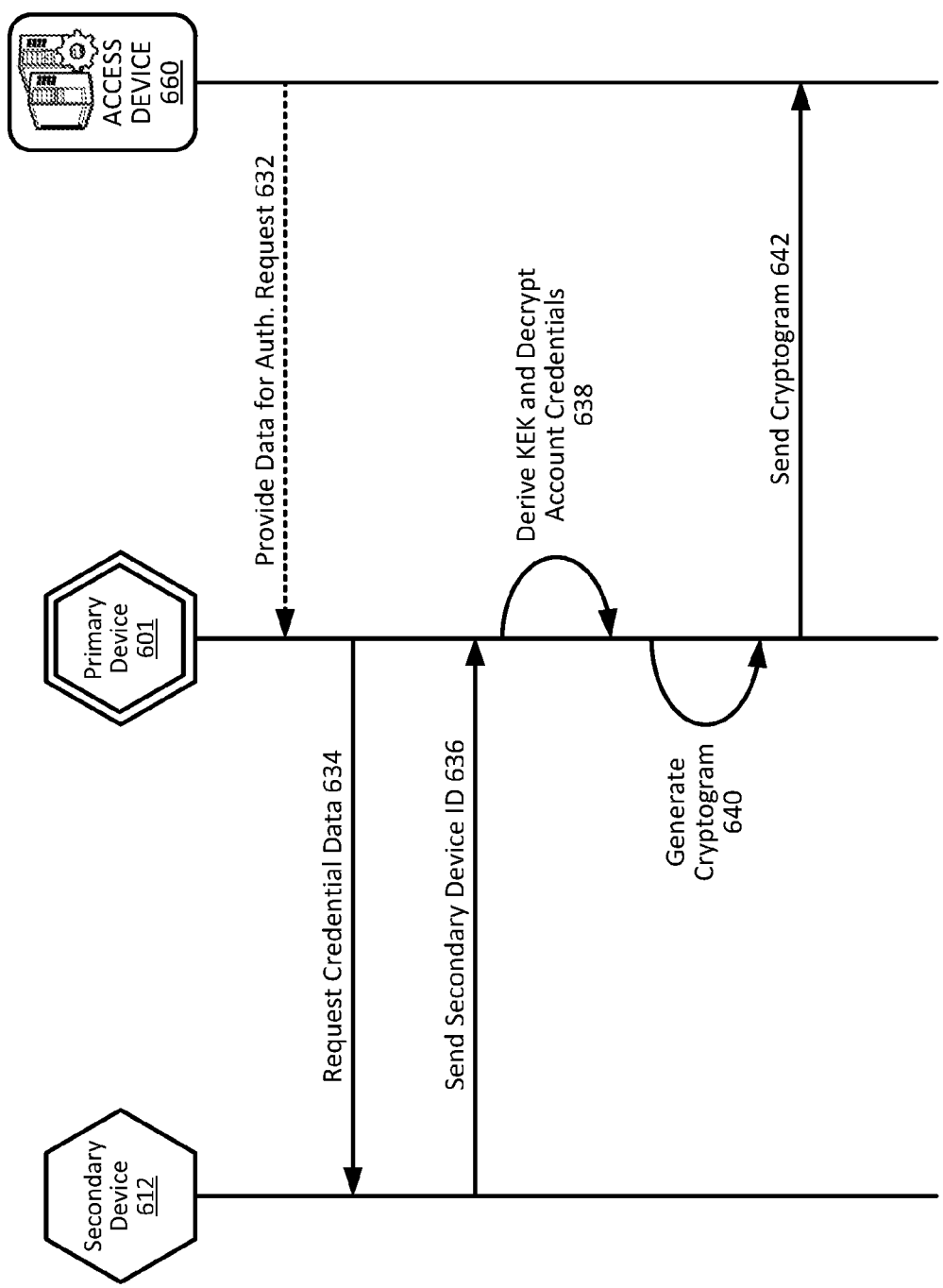
FIG. 6 illustrates a communication flow diagram of utilizing secondary device assisted credential storage to request authorization to use an account, according to some embodiments.

FIG. 6 illustrates a communication flow diagram of requesting authorization to use an account in which a secondary device provides assisted credential storage to a primary device, according to some embodiments. Primary device 601 may interact with access device 660 to request authorization to use an account. Access device 660 can be a remote web server or a POS terminal in proximity to primary device 601. In some embodiments, as part of the authentication process to verify primary device 601, access device 660 may provide to primary device 601 at step 632 dynamic data pertaining to the request for authorization to use the account associated with the user. The dynamic data may include information from access device 660 that is used as input data for the generation of the cryptogram by primary device 601. For example, the dynamic data may include an unpredictable number from access device 660. In embodiments in which the request for authorization to use the account relates to a transaction, the dynamic data may include transaction information such as a transaction amount from access device 660.

At step 634, primary device 601 may send a request to secondary device 612 for credential data of secondary device 612. The credential data of secondary device 612 being requested may include the device data of secondary device 612 that was used to generate the key-encrypt key such as the device ID of secondary device 612. At step 636, the secondary device sends the requested credential data to primary device 601. As mentioned above, the credential data of secondary device 612 may include device data such as the device ID of secondary device 612. In embodiments in which some or all of the encrypted account credentials (e.g., token and/or cryptogram key) are stored on secondary device 612, any encrypted account credentials stored on secondary device 612 can also be provided to primary device 601 as part of the credential data of secondary device 612.

At step 638, after primary device 601 receives the credential data of secondary device 612, primary device 601 can derive the key-encryption key and decrypt the encrypted account credentials stored on primary device 601 and/or received from secondary device 612. For example, primary device 601 may encrypt the device data (e.g., device ID) of secondary device 612 using the shared key previously provisioned to primary device 601 to derive the key-encryption key. Primary device 601 may then decrypt any encrypted account credentials (e.g., token and/or cryptogram key) stored on primary device 601, and any encrypted account credentials received from secondary device 612 using the key-encryption key to obtain the unencrypted token and/or unencrypted cryptogram key.

At step 640, primary device 601 may generate a cryptogram that is used by an authorization server to verify primary device 601. In embodiments in which access device 660 provided dynamic data pertaining to the request for authorization at step 632, primary device 601 may encrypt some or all of the dynamic data received from access device 660 using the cryptogram key. In some embodiments, the data input to the cryptogram generation function may also include a counter value counting the number of requests to use the account initiated by primary device 601. In embodiments in which the request for authorization to use the account does not require primary device 601 to encrypt dynamic data from access device 660, primary device 601 may encrypt a predetermined static string using the cryptogram key to generate the cryptogram.

At step 642, primary device 601 transmits the token and the generated cryptogram to access device 660 to request authorization to use the account associated with the token. Access device 660 may then generate an authorization request message that includes the token, the cryptogram, and any dynamic data pertaining to the request that access device 660 has previously provided to primary device 601 at step 632. Access device 660 then sends the authorization request message to the authorization server to obtain authorization for primary device 601 to use the account.

When authorization server receives the authorization request message, the authorization server can convert the token back to the account identifier substituted by the token, determine the cryptogram key associated with the token that was provisioned to primary device 601, and regenerate the cryptogram using the cryptogram key (e.g., by encrypting the dynamic data pertaining to the request, or by encrypting a predetermined string if dynamic data from access device 660 is not used in the cryptogram generation, etc.). If the regenerated cryptogram matches the cryptogram received from primary device 601, the authorization server can grant the authorization to use the account.

In some embodiments, the secondary device may be unavailable and may not be present at the time the primary device interacts with an access device. For example, if the secondary device is a user's vehicle, when the user leaves the vehicle and conducts a transaction with an access device inside a merchant store using the user's smartphone as the primary device, the vehicle will not be in the presence of the smartphone at the time the mobile device interacts with the access device to request authorization to use the user's account. In such scenarios where the secondary device may not be in the presence of the primary device, the primary device may request and temporarily store the credential data from the secondary device when the primary device is still communicatively coupled to the secondary device. The credential data of the secondary device can be stored for a predetermined time period (e.g., 10 minutes, 15 minutes 30 minutes, etc.) after which the credential data of the secondary device is automatically deleted from the primary device. In this manner, the primary device can interact with the access device to request authorization to use the user's account without requiring the secondary device be present with the primary device, so long as the interaction with the access device is performed within the predetermined time period of the primary device obtaining the credential data of the secondary device.

In some embodiments, the credential data of the secondary device can be provided to a secure cloud storage (e.g., a remote server) for backup. At the time of interaction between the primary device and the access device to request authorization to use the user's account, if the primary device determines that the secondary device is not in the presence of the primary device or is unavailable, the primary device may send a request to the secure cloud storage for the credential data of the secondary device. The secure cloud storage may send the credential data of the secondary device to the primary device to enable the primary device to decrypt the account credentials the primary device may need. In some embodiments, the secure cloud storage may require a stepped-up authentication scheme such as requesting the user to enter a PIN, passcode, or password on the primary device before providing the credential data to the primary device.

The secondary device assisted credential storage techniques described above need not be limited to just using one secondary device, and can also be extended to multiple secondary devices. In some embodiments, the primary device can be provisioned with a different set of account credentials (e.g., token and/or cryptogram key) for each secondary device in a set of secondary devices registered with the authorization server. For example, a different token and/or a different cryptogram key can be generated by the authorization server for each secondary device. In embodiments in which some or all of the account credentials are stored on the primary device, the account credentials provisioned for a particular secondary device can be stored on the primary device together with a hash of the device ID of the secondary device. The hash of the device ID can be used as an index to allow the primary device to properly retrieve the account credentials associated with a particular secondary device. In this manner, when the primary device request credential data from a particular secondary device when interacting with an access device, the primary device can obtain the device ID of the secondary device, generate a hash of the device ID, and use the hash to look up the proper set of account credentials associated with the particular secondary device stored on the primary device.

In some embodiments, a single set of account credentials (e.g., a token and/or a cryptogram key) can also be encrypted using a key-encryption key derived from device data of multiple secondary devices. For example, the device data of a first secondary device can be combined with the device data of a second secondary device (e.g., using one or more mathematical operations such as addition, etc. and/or one or more logical operations such as XOR, etc., or concatenated together), and the key-encryption key can be generated by encrypting the combined device data of multiple secondary devices with the shared key. When the primary device interacts with an access device to request authorization to use an account, the primary device may request the device data from each secondary device whose device data was used in the derivation of the key-encryption key.

In some embodiments, a single set of account credentials can also be split into multiple portions, and each portion can be encrypted using a different key-encryption key that is derived from the device data of a different secondary device. For example, a token can be encrypted using a first key-encryption key derived from the device data of a first secondary device, and the cryptogram key can be encrypted using a second key-encryption key derived from the device data of a second secondary device. As another example, a token can be split into two portions, and the first token portion can be encrypted using a first key-encryption key derived from the device data of a first secondary device, and the second token portion can be encrypted using a second key-encryption key derived from the device data of a second secondary device.

In some embodiments, storage of different portions of the account credentials on a set of secondary devices can also be randomized, and the primary device may maintain a mapping of which portion is stored on which secondary device such that the primary device can properly recover the account credentials. For example, a first portion of account credentials encrypted using a first key-encryption key derived from the device data of a first secondary device can be stored on a second secondary device, and a second portion of account credentials encrypted using a second key-encryption key derived from the device data of the second secondary device can be stored on the first secondary device. When the primary device requests the credential data from the two secondary devices, the first secondary device may provide the second portion of account credentials and device data of the first secondary device to the primary device, and the second secondary device may provide the first portion of account credentials and device data of the second secondary device to the primary device. The primary device, having knowledge of the mapping of which portion of the account credentials are stored on which secondary device, can then use the device data received from the first secondary device to decrypt the portion of the account credentials received from the second secondary device, and use the device data received from the second secondary device to decrypt the portion of the account credentials received from the first secondary device.

IV. Enhanced Authentication Using Secondary Device Assisted Cryptography

In some embodiments, a secondary device can also provide enhanced authentication by assisting with the cryptogram generation on behalf of a primary device if the secondary device has cryptographic capabilities. For example, during the cryptogram generation, the primary device may generate a first intermediate cryptogram and send the first intermediate cryptogram to the secondary device. The secondary device may then generate a second intermediate cryptogram from the first intermediate cryptogram, and send the second intermediate cryptogram back to the primary device. Subsequently, the primary device generates the final cryptogram from the second intermediate cryptogram, and transmits the final cryptogram to an access device to request authorization to use the user's account.

Figure 7:
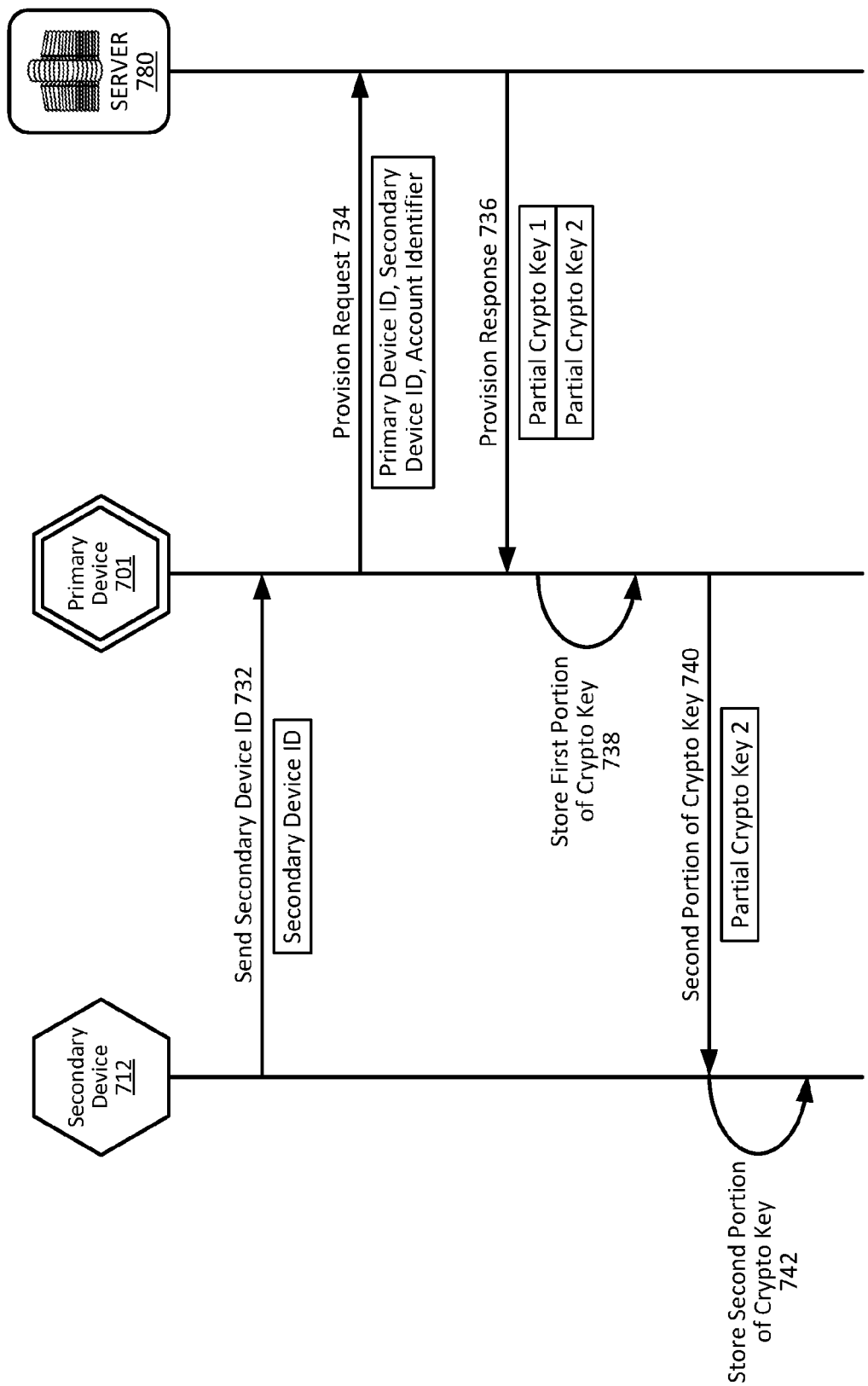
FIG. 7 illustrates a communication flow diagram of a provisioning process for secondary device assisted cryptography, according to some embodiments.

FIG. 7 illustrates a communication flow diagram of a provisioning process to provision account credentials to a primary device interacting with a secondary device for assisted cryptography authentication, according to some embodiments. Primary device 701 may establish a communication channel with secondary device 712 to communicate with secondary device 712. The communication channel may employ end-to-end encryption to protect the information exchanged between the devices, or may employ obfuscation techniques to protect the information exchanged between the devices. In some embodiments, the communications between the primary and secondary devices can be digitally signed by the corresponding device. The communication channel between primary device 701 and authentication server 780 can employ end-to-end encryption, for example, using a protocol such as Opacity that does not require handshaking between the primary device and the authorization server to establish a secure communication channel.

At step 732, secondary device 712 may send device data of secondary device 712 such as a device ID to primary device 701. The device data can be received as part of the process to establish the communication channel between primary device 701 and secondary device 712, or in response to primary device 701 requesting the device data from secondary device 712. At step 734, primary device 701 may send a provision request to authorization server 780 to request account credentials for an account of the user. In some embodiments, authorization server 780 can be a token server that manages and provisions tokens to communication devices. The provision request may include the device ID of primary device 701, an account identifier to identify the account for which the account credentials are being requested, and device data such as the device ID of secondary device 712.

When authentication server 780 receives the provision request, authentication server 780 may verify that the account is in good standing. If the account is in good standing, authentication server 780 may generate account credentials for the account. The account credentials may include a cryptogram key that can be used by primary device to generate a cryptogram when requesting authorization to use the account. The cryptogram key may include multiple portions. For example, the cryptogram key can be composed of two partial cryptogram keys. The account credentials may also include a token that can be used as a substitute for the account identifier. In some embodiments, the cryptogram key can be a limited-use key that is associated with a set of one or more limited-use thresholds. When usage of the limited-use key has exceed its one or more limited-use thresholds, the limited-use key and the cryptograms generated with the limited-use key will no longer be valid, and a new limited-use key should be replenished from authentication server 780.

At step 736, authentication server 780 sends the account credentials including the partial cryptogram keys to primary device 501. At step 738, primary device 701 stores the first portion of the cryptogram key on primary device 701. At step 740, primary device 701 may send the second portion of the cryptogram key to secondary device 712. At step 742, secondary device 712 stores the second portion of the cryptogram key on secondary device 512. In embodiments in which the account credentials include a token, the token can be stored on either primary device 701 or secondary device 712, or can be split and stored on both devices. In some embodiments, if secondary device 712 can communicate with authentication server 780 directly, instead of using primary device 701 to forward to secondary device 712 the portion of account credentials to be stored on secondary device 712, authentication server 780 may send the portion of the account credentials to be stored on secondary device 712 directly to secondary device 712, and may omit sending that portion of the account credentials to primary device 701.

In some embodiments, secondary device 712 can be provisioned asynchronously from primary device 701. In other words, secondary device 712 can be provisioned with the second portion of the cryptogram key at a different time than when primary device 701 is provisioned with the first portion of the cryptogram key. For example, primary device 701 may store the device data received from secondary device 712, and send the provision request to authorization server 780 at a later time when primary device 701 is no longer communicatively connected to secondary device 712. Primary device 701 may also store the second portion of the cryptogram key received from authorization server 780 intended for storage on secondary device 712 until primary device 701 re-establishes connectivity to secondary device 712 at a later time. In some embodiments, authorization server 780 may provision secondary device 712 independently and separately from primary device 701. Hence, in some embodiments, secondary device 712 can be provisioned without requiring an active connection to primary device 701 when primary device 701 sends the provision request to authorization server 780.

Figure 8:
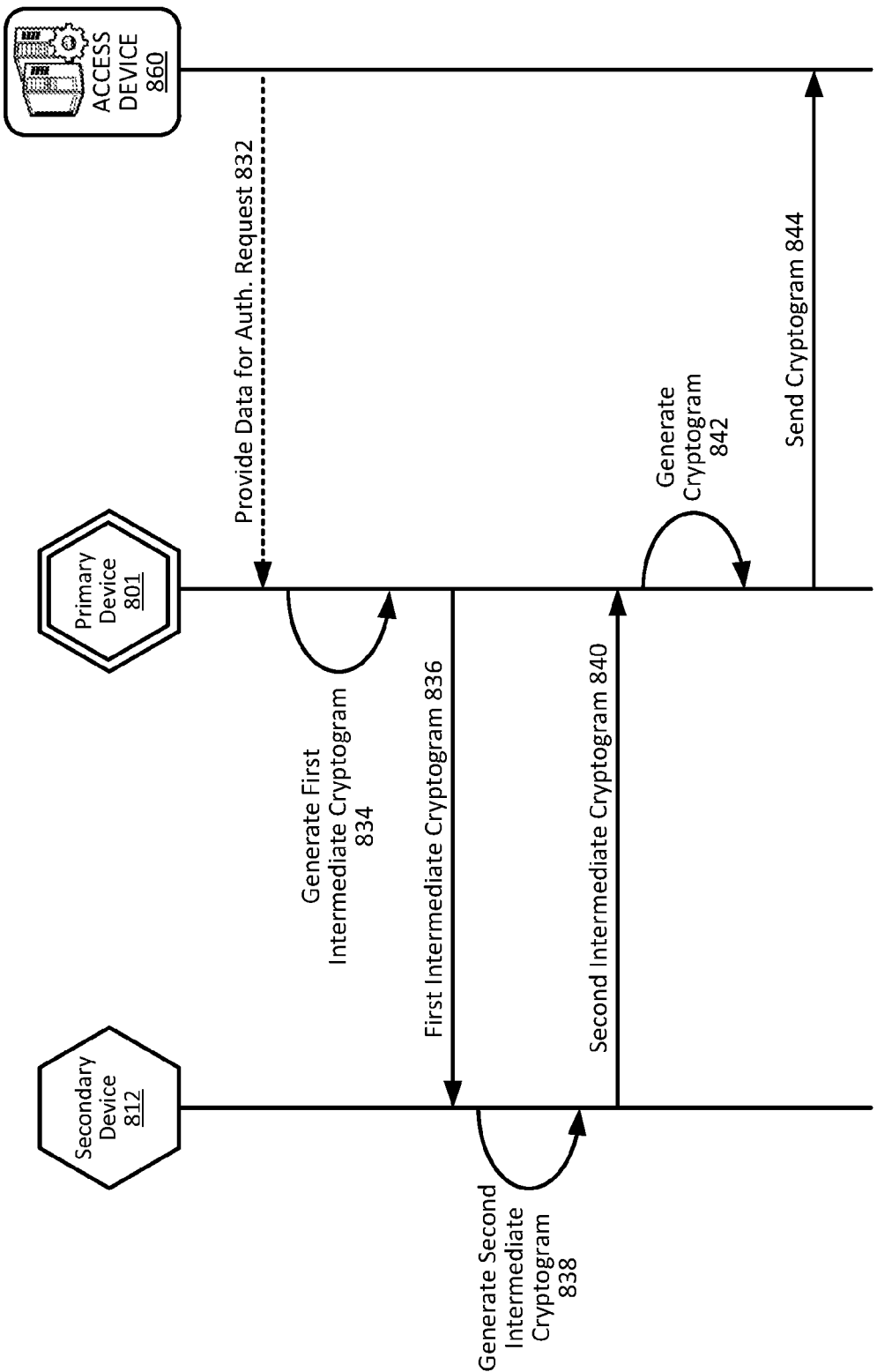
FIG. 8 illustrates a communication flow diagram of utilizing secondary device assisted cryptography to request authorization to use an account, according to some embodiments.

FIG. 8 illustrates a communication flow diagram of requesting authorization to use an account in which a secondary device provides assisted cryptography to a primary device, according to some embodiments. Primary device 801 may interact with access device 860 to request authorization to use an account. Access device 860 can be a remote web server or a POS terminal in proximity to primary device 801. In some embodiments, as part of the authentication process to verify primary device 801, at step 832, access device 860 may provide to primary device 801 dynamic data pertaining to the request for authorization to use the account. The dynamic data may include information from access device 860 that is used as input data for the generation of the cryptogram by primary device 801. For example, the dynamic data may include an unpredictable number from access device 860. In embodiments in which the request for authorization to use the account relates to a transaction, the dynamic data may include transaction information such as a transaction amount from access device 860.

At step 834, primary device 801 may generate a first intermediate cryptogram using the first portion of the cryptogram key stored on primary device 801. For example, primary device 801 may perform one or more cryptographic operations (e.g., encryption/decryption) on some or all of the dynamic data received from access device 860 using the first portion of the cryptogram key stored on primary device 801. In some embodiments, the data input to the cryptographic function may also include a counter value counting the number of requests to use the account that have been initiated by primary device 801. In embodiments in which the request for authorization to use the user's account does not require primary device 801 to generate a cryptogram based on dynamic data received from access device 860, primary device 801 may perform the one or more cryptographic operations on a predetermined static string using the first portion of the cryptogram key stored on primary device 801 to generate the first intermediate cryptogram.

At step 836, primary device 801 sends the first intermediate cryptogram 836 to secondary device 812. At step 838, secondary device 812 may generate a second intermediate cryptogram from the first intermediate cryptogram using the second portion of the cryptogram key stored on secondary device 812. For example, secondary device 812 may perform one or more cryptographic operations on the first intermediate cryptogam using the second portion of the cryptogram key to generate the second intermediate cryptogram. At step 840, secondary device 812 sends the second intermediate cryptogram to primary device 801.

At step 842, primary device 801 may generate the final cryptogram from the second intermediate cryptogram using the first portion of the cryptogram key stored on primary device 801. For example, primary device 801 may perform one or more cryptographic operations on the second intermediate cryptogam using the first portion of the cryptogram key to generate the final cryptogram. At step 844, primary device 844 sends the final cryptogram and any additional account credentials required (e.g., token) to access device 860 to request authorization to use the user's account. Access device 860 may then generate an authorization request message that is sent to an authorization server to obtain authorization to use the user's account according to the techniques described herein.

Figure 9:
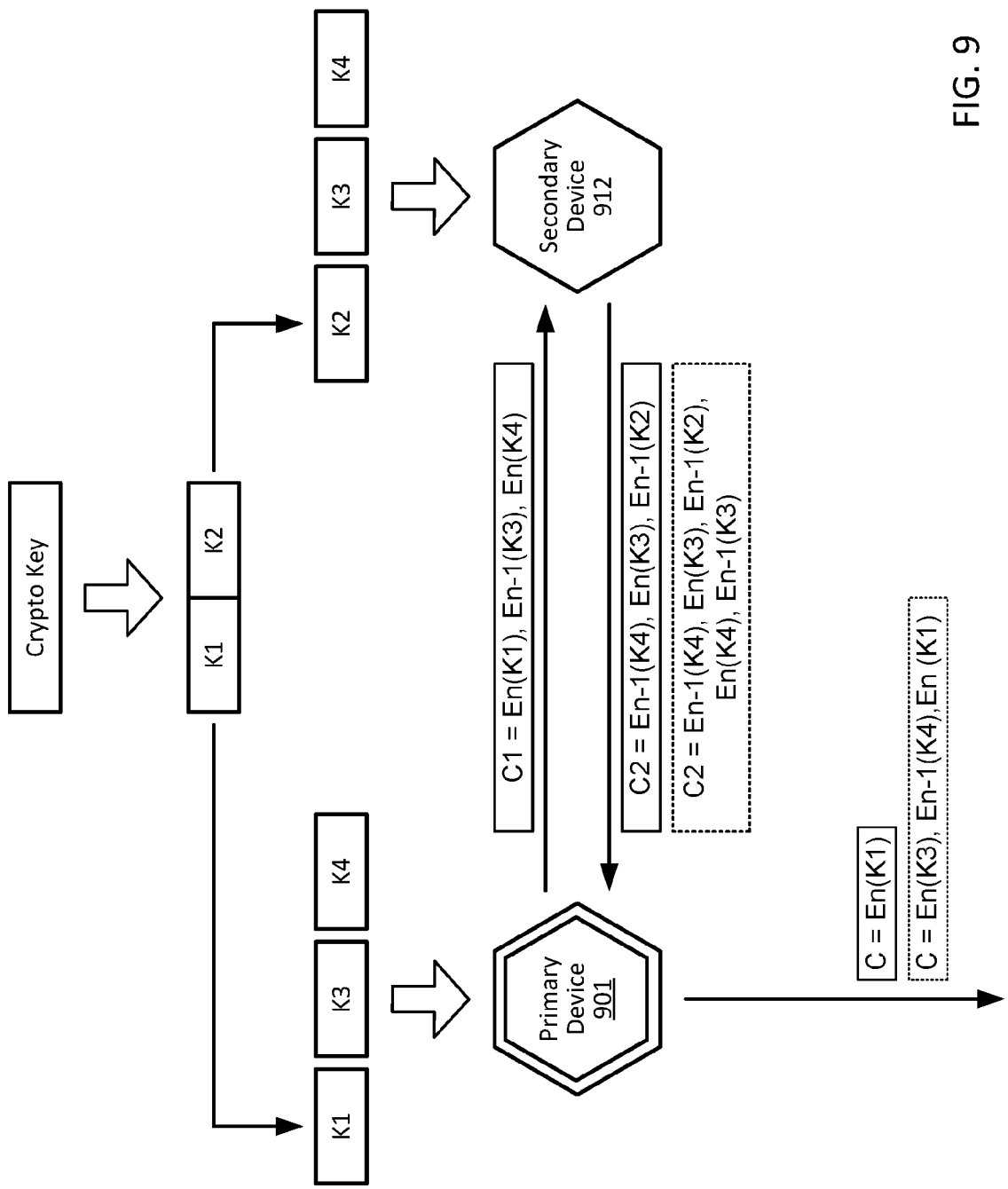
FIG. 9 illustrates a conceptual diagram of an example technique for generating a cryptogram cooperatively by two communication devices, according to some embodiments.

FIG. 9 illustrates a conceptual diagram of an example technique for generating a cryptogram by a primary device cooperating with a secondary device, according to some embodiments. The encryption protocol used for the encryption and decryption operations can be, for example, DES (data encryption standard), AES (advanced encryption standard), or other suitable encryption/decryption algorithms.

A cryptogram key being provisioned from an authorization server can be split into a first portion K1 and a second portion K2. For example, if the cryptogram key is 16 bytes, K1 can be the first 8 bytes of the cryptogram key, and K2 can be the second 8 bytes of the cryptogram key. The first portion of the cryptogram key K1 can be provisioned to primary device 901, and the second portion of the cryptogram key K2 can be provisioned to secondary device 912. In some embodiments, a first intermediate key K3 and a second intermediate key K4 can also be provisioned to both primary device 901 and secondary device 912.

Primary device 901 may start the cryptogram generation process by obtaining the input data to the cryptogram function (e.g., dynamic data received from an access device, a predetermined static string from memory, etc.). The first intermediate cryptogram C1 can be generated by encrypting the input data with the first portion of the cryptogram key K1, decrypting this first result with the first intermediate key K3, and then re-encrypting this second result with the second intermediate key K4. The first intermediate cryptogram C1 is then provided to secondary device 912.

Secondary device 912 then generates the second intermediate cryptogram C2 from the first intermediate cryptogram C1 received from primary device 901. In some embodiments, the second intermediate cryptogram C2 can be generated by decrypting C1 with the second intermediate key K4, encrypting this first result with the first intermediate key K3, and then decrypting this second result with the second portion of the cryptogram key K2. The second intermediate cryptogram C2 is then provided to primary device 901, and primary device 901 can generate the final cryptogram C that is sent to an access device by encrypting C2 with the first portion of the cryptogram key K1.

In some embodiments, for stronger transport protection, the second intermediate cryptogram C2 can be generated by decrypting C1 with the second intermediate key K4, encrypting this first result with the first intermediate key K3, decrypting this second result with the second portion of the cryptogram key K2, re-encrypting this third result with the second intermediate key K4, and then re-decrypting this fourth result with the first intermediate key K3. In such embodiments, primary device 901 can generate the final cryptogram C that is sent to an access device by encrypting C2 with the first intermediate key K3, decrypting this first result with the second intermediate key K4, and then re-encrypting this second result with the first portion of the cryptogram key K1.

V. Exemplary Processes

Figure 10:
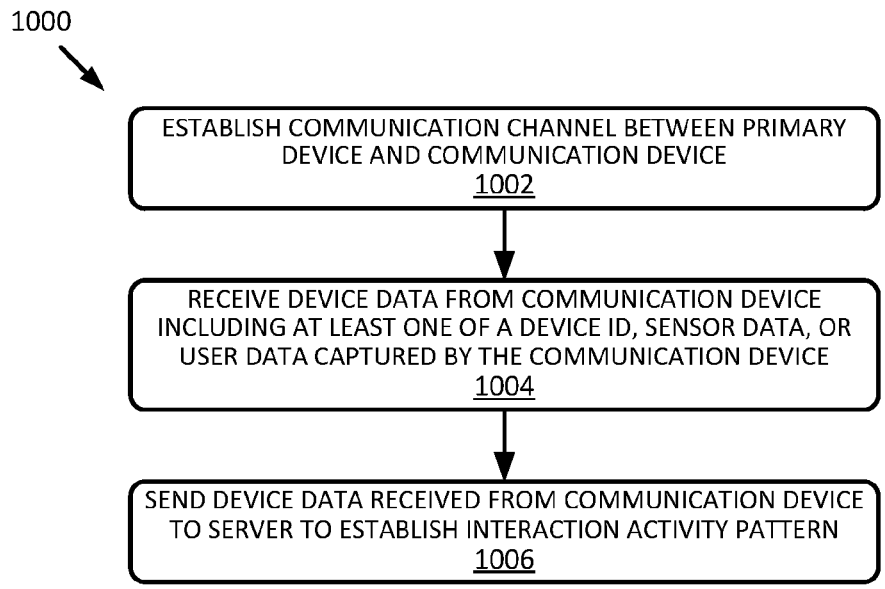
FIG. 10 illustrates a flow chart of a process for establishing an interaction activity pattern, according to some embodiments.

FIG. 10 illustrates a flow chart of a process 1000 for establishing an interaction activity pattern associated with a primary device, according to some embodiments. Process 1000 can be repeated for each communication device (e.g., secondary or tertiary device) that the primary device interacts with. At block 1002, a communication channel is established between the primary device and a communication device that interacts with the primary device. At block 1004, the primary device may receive device date from the communication device including at least one of a device ID of the communication device, sensor data sensed by the communication device, or user data captured by the communication device. At block 1006, the device data received from the communication device is sent to a server to establish the interaction activity pattern at the server. Device data of the primary device (e.g., device ID of the primary device, sensor data sensed by the primary device, or user data captured by the primary device) can also be sent to the server to establish the interaction activity pattern.

In some embodiments, a timestamp can be sent together with the device data to allow the server to correlate the interactions between the primary device and the communication device with a time period of the day. Thus, the interaction activity pattern can be established further based on the time of day of when the primary device interacted with each communication device. In some embodiments, the device data may include location data of the communication device and/or the primary device, and the location data can be used to derive a geographic perimeter representing a geo-fence around locations that the user typically visits. The interaction activity pattern including the derived geographic perimeter can be used to provide a risk assessment as to whether a primary device attempting to request authorization to use an account is being operated in a manner consistent with the user's typical behavior.

Figure 11:
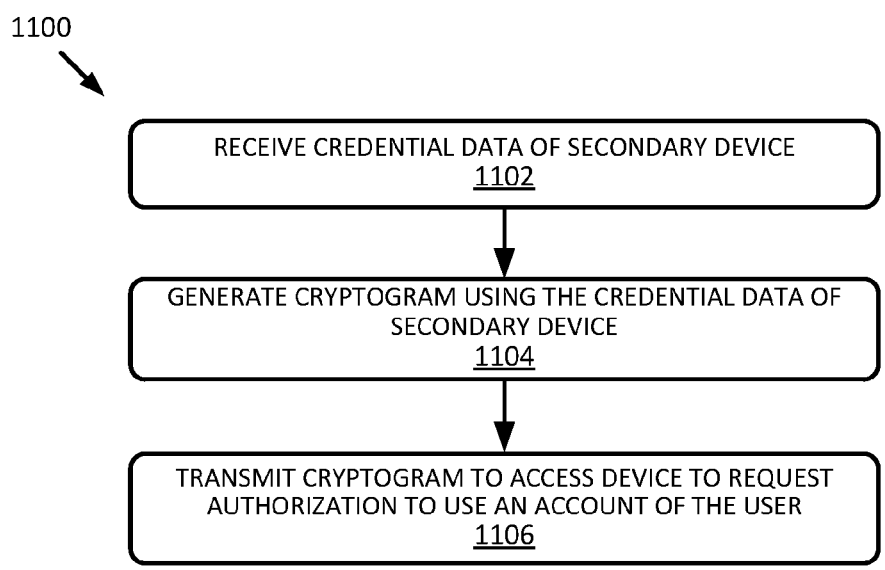
FIG. 11 illustrates a flow chart of a process for requesting authorization to use an account, according to some embodiments.

FIG. 11 illustrates a flow chart of a process 1100 to request authorization to use an account of a user of a primary device, according to some embodiments. At block 1102, a primary device may receive credential data of a secondary device. The credential data can be, for example, device data such as a device identifier of the secondary device, or an intermediate cryptogram generate by the secondary device. In some embodiments, the credential data may include account credentials associated with the account of the user stored on the secondary device (e.g., full or partial token, and/or full or partial cryptogram key). At block 1104, the primary device generates a cryptogram using the credential data of the secondary device.

At block 1106, the primary device transmits the cryptogram to an access device to request for authorization to use an account associated with the user of the primary device. The request for authorization to use the account can be, for example, a request to access information about the account, a request to use the account to access a service or a product, a request to use the account to conduct a transaction, etc. In some embodiments, the access device can be a remote web server, and the cryptogram can be transmitted to the access device over a computer network such as the Internet. In some embodiments, the access device can be an access terminal such as a POS terminal located in proximity to the primary device, and the cryptogram can be transmitted to a contactless reader of the access terminal using short or midrange contactless communication technologies (e.g., NFC, Bluetooth, BLE, etc.), or by presenting an image (e.g., QR code, bar code, etc.) representing the cryptogram to an optical reader of the access terminal.

In some embodiments, the access device may forward the cryptogram to an authorization server. Authorization to use the account can be granted based on verification of the cryptogram and the interaction activity pattern of interactions between the primary device and a set of communication devices including the secondary device. For example, the authorization server may compare recent interactions between the primary device and one or more of the communication devices with the interaction activity pattern to determine if the primary device is being used in a manner consistent with the user's typical behavior and/or being used at a location consistent with where the user's typical travels. In some embodiments, if the cryptogram is verified and the primary device is being used in a manner consistent with the interaction activity pattern, then it is likely that the user of the primary device is an authorized user, and authorization to use the account can be granted without restrictions. In some embodiments, if the cryptogram is verified and it appears the primary device is being used in a manner that deviates from the interaction activity pattern, the authorization to use the account can be still be granted, but the authorization can be granted with restrictions on how the account can be used. For example, a limit on a transaction amount can be imposed in such a scenario.

Figure 12:
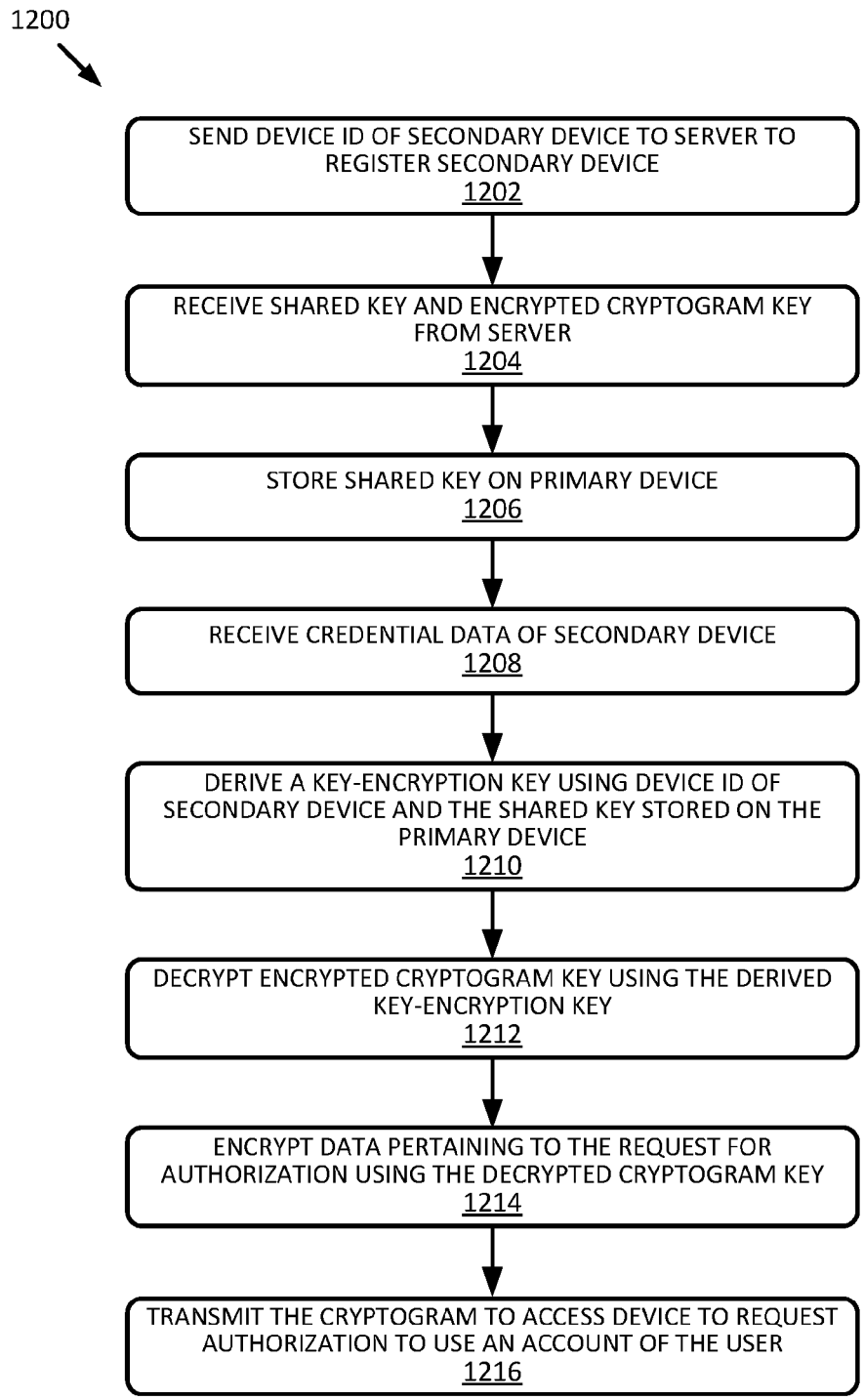
FIG. 12 illustrates a flow chart of a process for utilizing secondary device assisted credential storage, according to some embodiments.

FIG. 12 illustrates a flow chart of a process 1200 for assisted credential storage by a secondary device to enhance authentication of a primary device, according to some embodiments. At block 1202, to register a secondary device that interacted with a primary device and to request provisioning of the primary device and secondary device, the primary device may send device data such as a device ID of the secondary device to an authorization server. At block 1204, in response to registering the secondary device, the primary device may receive a shared key and an encrypted cryptogram key from the authorization server. In some embodiments, the primary device may also receive an encrypted token. The encrypted cryptogram key and/or encrypted token can be encrypted by the authorization server using a key-encryption key that is derived from the shared key and the device data of the secondary device.

At block 1206, the primary device stores the shared key on the primary device. In some embodiments, the encrypted cryptogram key and/or the encrypted token can also be stored on the primary device. In some embodiments, the primary device may forward the encrypted cryptogram key and/or the encrypted token to the secondary device for storage on the secondary device. In some embodiments, part of the encrypted cryptogram key and/or part of the encrypted token can be stored on the primary device, and the remaining part of the encrypted cryptogram key and/or remaining part of the encrypted token can be stored on the secondary device.

Once the primary device and secondary device have been provision, the primary device may interact with an access device to request authorization to use an account associated with the user of the primary device. At block 1208, the primary device may receive credential data of the secondary device. The credential data may include the device data of the secondary device that was used to derive the key-encryption key such as the device ID of the secondary device. If any part of the encrypted cryptogram key and/or encrypted token is stored on the secondary device, the primary device may also receive the encrypted cryptogram key and/or encrypted token from the secondary device as part of the credential data of the secondary device.

At block 1210, the primary device can then derive a key-encryption key using the device identifier of the secondary device and the shared key stored on the primary device. At block 1212, the primary device decrypt the encrypted cryptogram key and/or the encrypted token using the derived key-encryption key. At block 1214, the primary device generates a cryptogram by encrypting data pertaining to the request for authorization using the decrypted cryptogram key. In some embodiments, the data pertaining to the request for authorization may include dynamic data received from the access device. In some embodiments, the data pertaining to the request for authorization may include a predetermined static string. At block 1216, the primary device transmits the cryptogram to the access device to request authorization to use an account of the user.

In some embodiments, presence of the secondary device may not be required when the primary device interacts with the access device. For example, the credential data such as the device ID of the secondary device can be received by the primary device from the secondary device beforehand prior to the time when the primary device interacts with the access device to request authorization. The credential data such as the device ID of the secondary device can be temporarily stored on the primary device for a predetermined time period. This would allow the primary device to interact with the access device to request authorization without presence of the secondary device, if the primary device interacts with the access device within the predetermined time period of when the credential data of the secondary device is received by the primary device. The credential data can be automatically deleted from the primary device when a predetermined time period from receiving the credential data has elapsed to prevent persistence storage of the credential data on the primary device. In some embodiments, the primary device may also send a request to a remote server for the credential data of the secondary device if the primary device determines that the secondary device is not available, and the credential data of the secondary device can be received by the primary device from the remote server.

Figure 13:
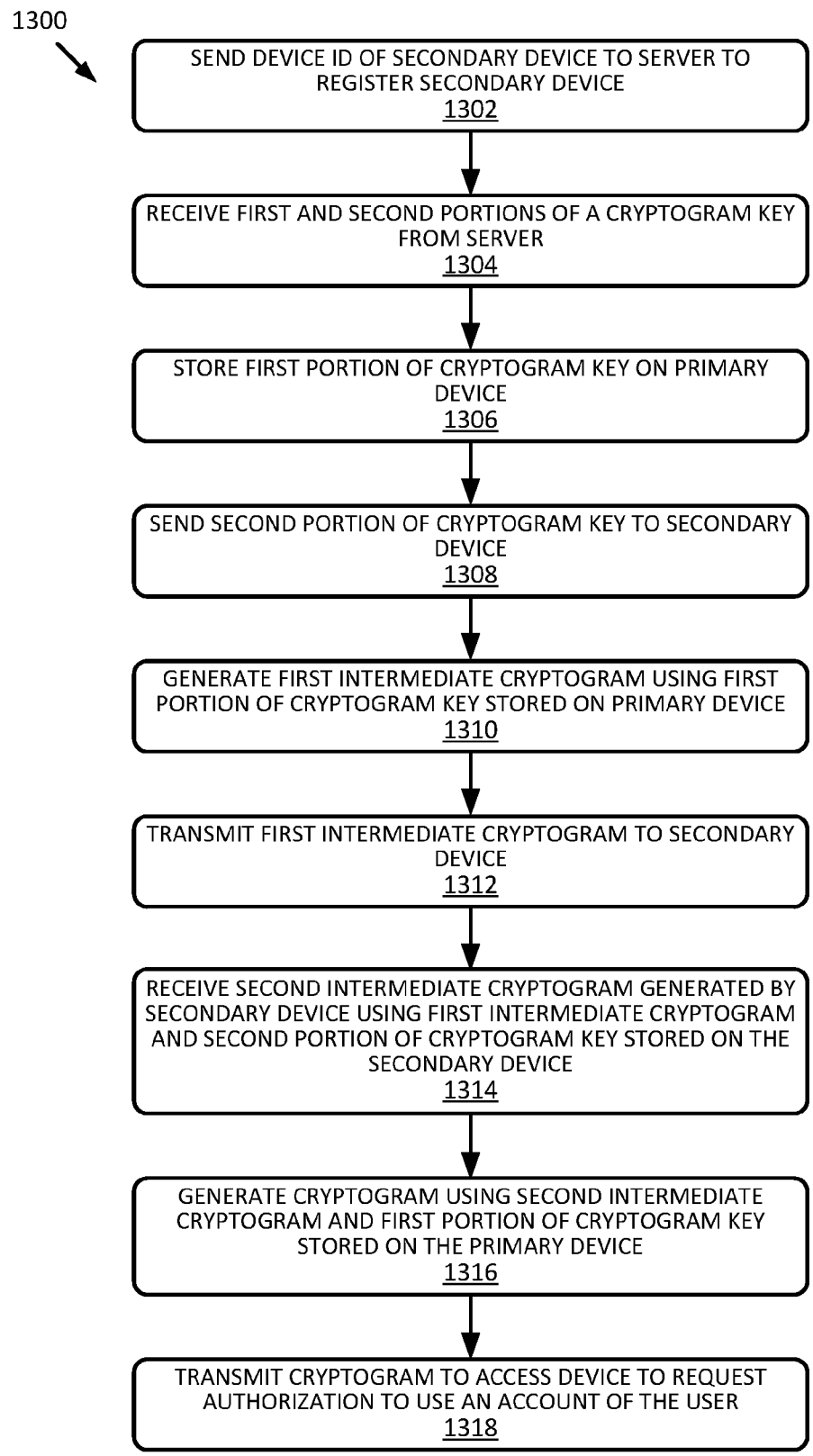
FIG. 13 illustrates a flow chart of a process for utilizing secondary device assisted cryptography, according to some embodiments.

FIG. 13 illustrates a flow chart of a process 1300 for assisted cryptography by a secondary device to enhance authentication of a primary device, according to some embodiments. At block 1302, to register a secondary device that interacted with a primary device and to request provisioning of the primary device and secondary device, the primary device may send device data such as a device ID of the secondary device to an authorization server. At block 1304, in response to registering the secondary device, the primary device may receive a cryptogram key from the authorization server. The cryptogram key can be partitioned into a first portion and a second portion. In some embodiments, the primary device may also receive a token. At block 1306, the primary device stores the first portion of the cryptogram key on the primary device. At block 1308, the primary device sends the second portion of the cryptogram key to the secondary device for storage on the secondary device. The primary device and secondary device may also be provisioned with a first intermediate key and a second intermediate key.

Once the primary device and secondary device have been provision, the primary device may interact with an access device to request authorization to use an account associated with the user of the primary device. At block 1310, to request authorization to use an account, the primary device may generate a first intermediate cryptogram using the first portion of the cryptogram key stored on the primary device. The first intermediate cryptogram can be generated by encrypting data pertaining to the request for authorization using the first portion of the cryptogram key, decrypting the encrypted data using a first intermediate key, and re-encrypting the decrypted data using a second intermediate key. At block 1312, the primary device transmits the first intermediate cryptogram to the secondary device.

At block 1314, the primary device receives a second intermediate cryptogram generated by the secondary device using the first intermediate cryptogam and the second portion of the cryptogram key stored on the secondary device. The second intermediate cryptogram can be received by the primary device as credential data of the secondary device. In some embodiments, the secondary device may generate the second intermediate cryptogram by decrypting the first intermediate cryptogram using the second intermediate key, re-encrypting the decrypted first intermediate cryptogram using the first intermediate key, decrypting the re-encrypted first intermediate cryptogram using the second portion of the cryptogram key. For stronger transport protection, the second intermediate cryptogram can be generated by further encrypting a result of decrypting the re-encrypted first intermediate cryptogram using the second intermediate key, and decrypting the encrypted result using first intermediate key.

At block 1316, the primary device generates a cryptogram that is sent to the access device using the second intermediate cryptogram and the first portion of the cryptogram key stored on the primary device. In some embodiments, the cryptogram can be generated by encrypting the second intermediate cryptogram using the first intermediate key, decrypting the encrypted second intermediate cryptogram using the second intermediate key, and re-encrypting the decrypted second intermediate cryptogram using the first portion of the cryptogram key. At block 1318, the primary device transmits the cryptogram to the access device to request authorization to use an account of the user.

VI. Exemplary Devices and Systems

Figure 14:
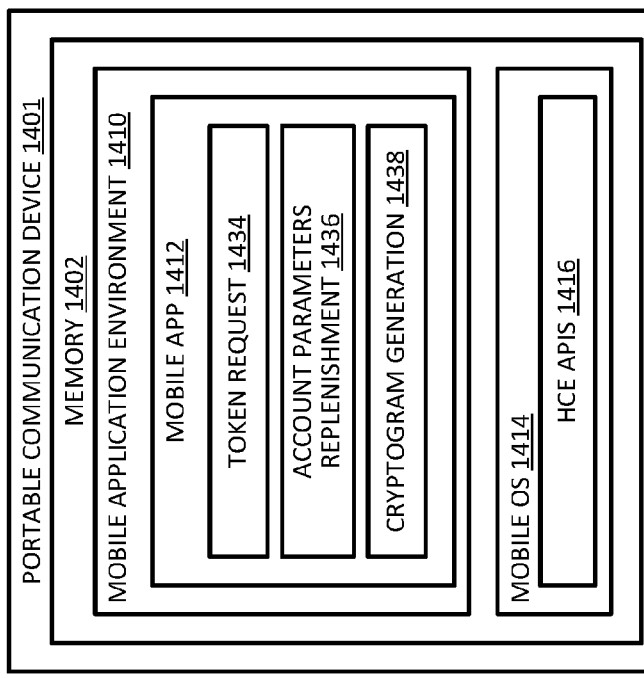
FIG. 14 illustrates a block diagram of a portable communication device, according to some embodiments.

FIG. 14 illustrates a block diagram of a portable communication device 1401 in which some embodiments of the processes described herein can be implemented. Portable communication device 1401 can be used as a primary device that interacts with an access device (e.g., via a contactless interface or via a network), as a communication hub that communicates with different communication devices, as a secondary device that assists another communication device with enhanced authentication, and/or as a tertiary device that is used as a user interface to control or communicate with a primary device.

Portable communication device 1401 may include device hardware 1404 coupled to a memory 1402. Device hardware 1404 may include a processor 1405, a communication subsystem 1409, use interface 1406, a display screen 1407 (which may be part of user interface 1406), and a contactless interface 1408. Processor 1405 can be implemented as one or more integrated circuits (e.g., one or more single core or multicore microprocessors and/or microcontrollers), and is used to control the operation of portable communication device 1401. Processor 1405 can execute a variety of programs in response to program code or computer-readable code stored in memory 1402, and can maintain multiple concurrently executing programs or processes. Communications subsystem 1406 may include one or more RF transceivers and/or connectors that can be used by portable communication device 1401 to communicate with other devices and/or to connect with external networks. User interface 1406 can include any combination of input and output elements to allow a user to interact with and invoke the functionalities of portable communication device 1401. In some embodiments, display screen 1407 may be part of user interface 1406.

Contactless interface 1408 may include one or more RF transceivers to interact with a contactless reader of an access device to conduct a transaction (e.g., payment transaction, access transaction, information exchange, etc.). In some embodiments, contactless interface 1408 can be accessed by the mobile OS 1414 using card emulation APIs 1416 without requiring the use of a secure element. In some embodiments, display 1407 can also be part of contactless interface 1408, and is used, for example, to perform transactions using QR codes, bar codes, etc.

Memory 1402 can be implemented using any combination of any number of non-volatile memories (e.g., flash memory) and volatile memories (e.g., DRAM, SRAM), or any other non-transitory storage medium, or a combination thereof media. Memory 1402 may store a mobile OS 1414 and a mobile application environment 1410 where one or more mobile applications reside including transaction application 1412 (e.g., mobile wallet application, mobile banking application, mobile payments application, merchant application, web browser, etc.) to be executed by processor 1405. In some embodiments, mobile OS 1414 may implement a set of card emulation APIs 1416 that can be invoked by transaction application 1412 to access contactless interface 1408 to interact with an access device.

According to some embodiments, transaction application 1412 can implement security-sensitive functions such as token request function 1434, account parameters replenishment function 1436, cryptogram generation function 1438, etc. Token request function 1434 can be invoked to request a token from a remote server (e.g., an authorization server such as a cloud-based transaction server, token server, issuer or host processing system, etc.). The token can be used as a substitute for a real account identifier to conduct transactions, for example, by sending the token to an access device. Using a token instead of a real account identifier can be more secure because the real account identifier is not transmitted when conducting a transaction. Token request function 1434 can be invoked, for example, at enrollment time to request an initial token, or when the lifespan of the current token has expired.

Account parameters replenishment function 1436 can be invoked to replenish or renew account parameters such as a limited-use key from a remote server (e.g., an authorization server such as a cloud-based transaction server, token server, issuer or host processing system, etc.). At the time of a transaction, the limited-use key is used to generate a cryptogram that is provided to an access device to conduct the transaction. The limited-use key may be associated with a set or one or more limited-use thresholds (e.g., valid for a predetermined period of time, predetermined number of transactions, and/or predetermined cumulative transaction amount) to limit the usage of the LUK. When one or more of the limited-use thresholds of the LUK has expired or is about to expire, account parameters replenishment function 1436 can be invoked to request a new LUK.

Cryptogram generation function 1438 can be invoked at transaction time to generate a cryptogram that is provided to an access device to conduct the transaction. The cryptogram can be generated by receiving dynamic transaction data from the access device (e.g., transaction amount, transaction date, unpredictable number, etc.), and encrypting the dynamic transaction data with the LUK. In some embodiments, the cryptogram can be generated by encrypting a static string using the LUK (e.g., if the access device does not support transmission of dynamic data to the portable communication device).

In some embodiments, transaction application 1412 can be automatically activated and be ready to conduct transactions with an access device if portable communication device 1401 is being used in accordance with the interaction activity pattern of 1401, and/or if a secondary device can provide additional assurance that portable communication device 1401 is being used by an authorized user. For example, transaction application 1412 can be activated if portable communication device 1401 is interacting with a secondary device that portable communication device 1401 typically interacts with during the particular time of the day, and/or if portable communication device 1401 is at a location within a geographic perimeter of where the user is typically located at during the particular time of the day. In some embodiments, transaction application 1412 can be activated if a secondary device can provide contextual data (e.g., heart rate or other biometric data) to indicate presence of the user with portable communication device 1401. In some embodiments, transaction application 1412 can be activated if credential data of a secondary device is available to portable communication device 1401 (e.g., if the secondary device is in presence of portable communication device 1401, or if portable communication device 1401 has recently obtained and temporarily stored the necessary credential data of a secondary device to conduct a transaction).

Figure 15:
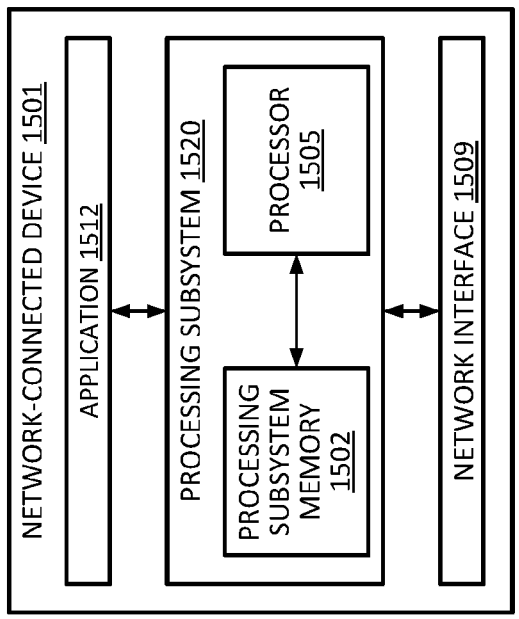
FIG. 15 illustrates a block diagram of a network-connected communication device, according to some embodiments.

FIG. 15 illustrates a block diagram of a network-connected communication device 1501 in which some embodiments of the processes described herein can be implemented. Network-connected communication device 1501 can be used as a primary device that interacts with an access device (e.g., via a network), as a communication hub that communicates with different communication devices, as a secondary device that assists another communication device with enhanced authentication, and/or as a tertiary device that is used as a user interface to control or communicate with a primary device. In some embodiments, network-connected communication device 1501 can be an access point device, a router device, a gateway device, a network-connected smart appliance device such as a set-top box, a smart TV, a smart refrigerator, etc.

Network-connected communication device 1501 may include a processing subsystem 1520, one or more network interfaces 1509, and a transaction application 1512. Processing subsystem 1520 can be implemented as one or more integrated circuits, e.g., one or more processors and/or controllers 1505, and/or one or more processing subsystem memories 1502. In operation, processing system 1520 can control the operation of network-connected communication device 1501. In some embodiments, processing subsystem 1520 can execute a variety of programs and/or processes in response to program code or instructions, and can maintain multiple concurrently executing programs or processes. At any given time, some or all of the program code or instructions to be executed by the one or more processors/controllers 1505 can be resident in processing subsystem 1520, for example, in processing subsystem memory 1502. Each processor/controller 1505 can be implemented as a microprocessor, a digital signal processor, an application specific integrated circuit, a field programmable gate array, analog circuit, digital circuit, and/or combinations thereof.

Network interface 1509 can include one or more internal network interfaces and/or one or more external network interfaces to facilitate exchange of communications within an internal network (e.g., a local area network, etc.), an external network, and/or between an internal network and an external network. In some embodiments, network-connected communication device 1501 may interact with different communication devices at different times via network interface 1509, or may simultaneously interact with multiple communication devices at the same time.

Transaction application 1512 can be implemented to have similar functionalities as those described with reference to transaction application 1412, and thus a detailed description of which need not be repeated. Transaction application 512 may enable network-connected communication device 1501 to operate as a primary device to conduct transactions with an access device. In some embodiments, transaction application 1512 can be stored in processing subsystem memory 1502 or in a general memory of network-connected communication device 1501.

Figure 16:
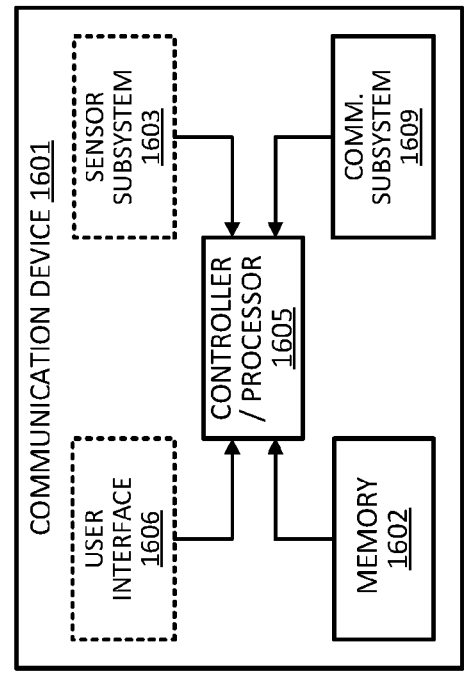
FIG. 16 illustrates a block diagram of a communication device, according to some embodiments.

FIG. 16 illustrates a block diagram of a communication device 1601 in which some embodiments of the processes described herein can be implemented. In some embodiments, communication device 1601 may lack a transaction application, and thus may be unable to conduct transactions directly with an access device. Nevertheless, in some embodiments, communication device 1601 can be used as a as a communication hub that communicates with different communication devices, as a secondary device that assists another communication device with enhanced authentication, and/or as a tertiary device that is used as a user interface to control or communicate with a primary device. In some embodiments, communication device 1601 can be a wearable communication device, a smart appliance device, a vehicle, etc.

Communication device 1601 may include a controller or processor 1605, a memory 1602 to store instructions executable by controller or processor 1605, and a communication subsystem 1609 to interact with other communication devices. Communication device 1601 may also include a user interface 1606 that can be used to control communication device 1601 or another device communicatively coupled to communication device 1601. User interface may include a display (e.g., a touch screen), and/or any number of buttons or input devices such as keyboard, keypad, etc. that a user can engage to invoke the functionalities of communication device 1601 and/or of another device communicatively coupled communication device 1601.

Communication device 1601 may also include a sensor subsystem 1603. Sensor subsystem 1603 may include any number of environmental sensors such as various electronic, mechanical, electromechanical, optical, or other devices that provide information related to external conditions around communication device 1601. In some embodiments, sensor subsystem 1603 can provide digital signals to controller or processor 1605, e.g., on a streaming basis or in response to polling by controller or processor 1605 as desired. Examples of environmental sensors may include an accelerometer, an magnetometer, an altimeter, a gyroscope, a satellite positioning receiver (e.g., GPS receiver), etc. In some embodiments, sensor subsystem 1603 may also include sound sensor, light sensor, camera, microphone, etc. In some embodiments, sensor subsystem may also include biometric sensors such as heart rate sensor, fingerprint sensor, etc.

Figure 17:
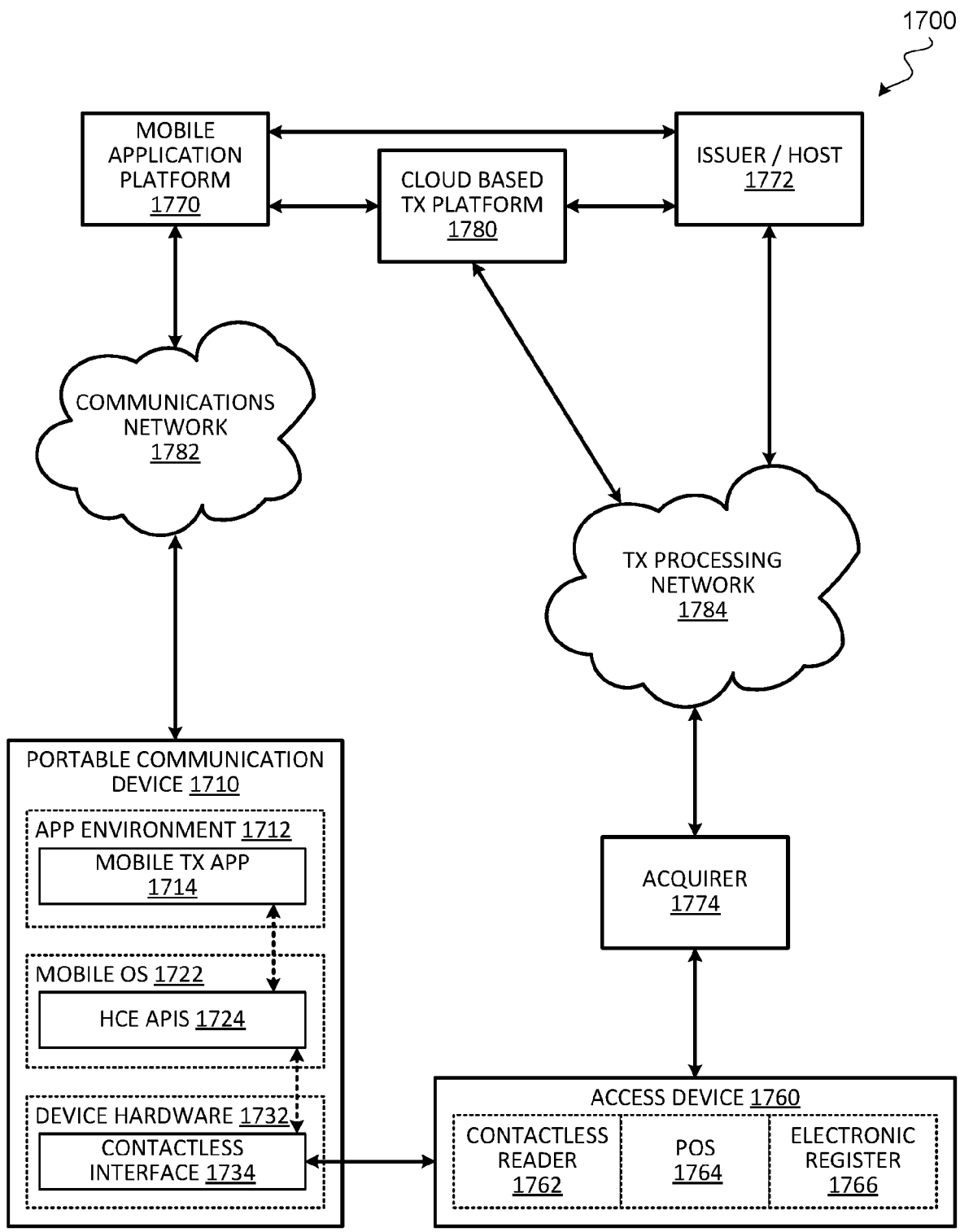
FIG. 17 illustrates a block diagram of an exemplary system, according to some embodiments.

FIG. 17 illustrates a block diagram of an exemplary system 1700 in which the enhanced authentication techniques described herein can be used, according to some embodiments. System 1700 can be, for example, a cloud-based transaction system for conducting cloud-based transactions. It should be understood that the enhanced authentication techniques described herein can be applied to other types of systems which may or may not relate to transaction processing.

System 1700 includes a portable communication device 1710 (e.g., a mobile device), a cloud-based transaction platform (CBP) 1780, and a mobile application platform (MAP) 1770. CBP 1780 may be implemented using one or more computing devices, and can be associated with or operated by an issuer, transaction processor, and/or other suitable entities. CBP 1780 implements a set of functionalities including account management, and account parameters generation and replenishment to enable could-based transactions to be conducted via portable communication device 1710.

MAP 1770 is used to facilitate communications between CBP 1780 and mobile application 1714 (e.g., a transaction application) in portable communication device 1710. MAP 1770 may be implemented using one or more computing devices, and can be associated with or operated by the service provider of mobile application 1714 (e.g., mobile software application), such as an issuer, a mobile wallet provider, a merchant, and/or other suitable entities. In some embodiments, MAP 1770 can be associated with or operated by the same entity as CBP 1780, or they can be separate. MAP 1770 is used to intermediate requests between the mobile application 1714 and CBP 1780, and to ensure that requests and responses initiated by either party are fulfilled once connectivity to portable communication device 1710 is established, for example, via a communications network 1782 (e.g., internet, mobile or cellular network, etc.). It should be understood that in some embodiments, one or more functionalities of CBP 1780, MAP 1770, and/or issuer or host processing system 1772, may be integrated into the same computing system or different computing systems. In some embodiments, any one or more of CBP 1780, MAP 1770, and/or issuer or host processing system 1772 can act as an authorization server.

Portable communication device 1710 can be used to conduct cloud-based transactions (e.g., payment transactions) facilitated by CBP 1780 and/or MAP 1770. Portable communication device 1710 includes device hardware 1732, mobile operating system (OS) 1722, and applications environment 1712. Device hardware 1732 includes a contactless interface 1734 that can contactlessly communicate or otherwise present information to another device such as a contactless reader 1062 of an access device 1760. Examples of contactless interface 1734 can include a near-field communications (NFC) interface that can send and receive communications using radio frequency, or other wireless communication protocols such as Bluetooth, Bluetooth Low Energy (BLE), Wi-Fi, etc. Examples of contactless interface 1734 may also include an optical interface such as a display to present information such as quick response (QR) codes, bar codes, etc.

Applications environment 1712 of portable communication device 1710 may include a mobile application 1714 such as a transaction application provided by a service provider (e.g., an issuer). For example, if the service provider of mobile application 1714 is an issuer, mobile application 1714 may be a mobile banking application or a mobile payment application. If the service provider is a mobile wallet provider such as a mobile network operator or third-party wallet provider that supports multiple issuers, mobile application 1714 may be a mobile wallet application. For merchants, mobile application 1714 may be a merchant's own transaction application from which consumers can conduct e-commerce or point of sale transactions, or a mobile wallet application supporting multiple merchants.

In some embodiments, mobile application 1714 may include on-device cloud-based transaction logic integrated into mobile application 1714 to support cloud-based transactions. The on-device cloud-based transaction logic performs functions to facilitate cloud-based transactions such as to take account parameters provided for use in payment transactions and deliver them to mobile operating system 1722 for transmission over contactless interface 1734. For example, the on-device cloud-based transaction logic may use a cryptogram key (e.g., a limited-use key) provisioned from CBP 1780 to generate a transaction cryptogram that is transmitted over contactless interface to access device 1760 to conduct a payment transaction. The transaction cryptogram can be sent over to the transaction processing network 1784 to obtain authorization for the payment transaction. The on-device cloud-based transaction logic also manages the initial service profile parameters that are provided after an account has been provisioned to ensure that requests for account parameter replenishment and other account parameter management activities are initiated.

To provision portable communication device 1710 for cloud-based payment transactions, CBP 1780 can be used to configure account portfolios associated with issuers and to provide portable communication device 1710 with account parameters for use when conducting cloud-based transactions. The account portfolios established by CBP 1780 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 1780. To ensure that cloud-based payment transactions are processed according to the rules specified in the service profile for an account portfolio, CBP 1780 performs various core functions during the lifetime of an account that has been enabled. These functions can include provisioning, active account management, verification for payment, transaction processing, lifecycle management and post-payment.

CBP 1780 may create a service profile for a portfolio before an account is provisioned as a cloud-based transaction account. Provisioning may include taking an enrolled account, create account information such as an alternate account identifier (e.g., alternate Primary Account Number (PAN)) or a token acting as an account identifier substitute that can be used instead of a real account identifier (e.g., a real PAN) to conduct transactions, and inheriting service profile has been established for the portfolio. Once an account is provisioned, the relevant service profile details are shared with both the transaction processing and the on-device cloud-based transaction logic to ensure that decision making can be done at transaction processing and during mobile application usage by the user.

Once an account is provisioned, active account management can be performed by CBP 1780. Active account management can be initiated either from transaction processing activity or from mobile application activity. After the account has been provisioned, the active account management capability generates the initial set of account parameters to be deployed to portable communication device 1710. The account parameters may include account information generated during provisioning (e.g., alternate account identifier or token), as well as dynamic information to ensure the set of account parameters have only a limited use or limited lifespan once delivered to the device. Dynamic information may include limited-use cryptogram keys or dynamic data depending on what type of transaction is being supported. For example, the dynamic information may include limited-use keys (LUK) to calculate cryptograms, as well as limited use dynamic data to support legacy dynamic card verification value or code based implementations.

During transaction processing, if the service profile parameters maintained by CBP 1780 for a particular account indicate that account parameters on portable communication device 1710 need to be replaced, the active account management capability of CBP 1080 may connect to portable communication device 1710 via MAP 1770 to replenish account parameters. Likewise, if the on-device service profile parameters stored on portable communication device 1710 indicate that account parameter replenishment is needed or is close to be being needed (i.e., by monitoring account parameter thresholds), then mobile application 1714 can make a request to CBP 1780 for account parameter replenishment.

Once portable communication device 1710 has been provisioned to conduct cloud-based transactions, transactions can be conducted via portable communication device 1710 by interacting with a contactless reader 1762 of an access device 1760 (e.g., at a merchant location). Components of access device 1760 may include point-of-sale (POS) terminal 1764 and/or electronic cash register 1766. In some embodiments, access device 1760 can be a web server associated with a merchant, and portable communication device 1710 can communicate with access device 1760 via a computer network. Access device 1760 can be coupled to acquirer 1774 (e.g., via a merchant computer not shown). Acquirer 1774 may be connected to an issuer or host processing system 1772 via transaction processing network 1784. Transaction processing network 1784 may include one or more server computers. A server computer is typically a powerful computer or cluster of computers. For example, the server computer can be a large mainframe, a minicomputer cluster, or a group of servers functioning as a unit. In one example, the server computer may be a database server coupled to a web server. Transaction processing network 1084 may use any suitable wired or wireless network, including the Internet.

Transaction processing network 1784 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 1774, transaction processing network 1784, issuer or host processing system 1772) may include one or more computers to enable communications, or to perform one or more of the functions described herein.

To conduct a cloud-based transaction, a user of portable communication device 1710 may tap portable communication device 1710 against contactless reader 1762 (e.g., via NFC) of access device 1760, or display an image such as a bar code or QR code on a screen of portable communication device 1710 that can be scanned by contactless reader 1762 (e.g., an optical scanner or reader) of access device 1760. In some embodiments, portable communication device 1710 may provide access device 1760 with an account identifier (e.g., an alternate account identifier, a token, etc.) and additional information such as limited-use account parameters or information derived from the limited-use account parameters. For example, an account identifier or token, and/or additional information (e.g., transaction cryptogram) can be encoded in a bar code or QR code that is scanned by access device 1760; or the account identifier or token, and/or additional information can be transmitted to access device 1760 via NFC. In some embodiments, the limited-use account parameters may include a transaction cryptogram.

Access device 1760 or a merchant computer coupled to access device 1760 may generate an authorization request message including the account identifier and additional information (e.g., limited-use account parameters, or information derived from the limited-use account parameters), and forward the authorization request message to acquirer 1774. The authorization request message is then sent to transaction processing network 1784. Transaction processing network 1784 then forwards the authorization request message to the corresponding issuer or host processing system 1772 associated with an issuer of the account associated with portable communication device 1710.

After issuer or host processing system 1772 receives the authorization request message, the authorization request message may be parsed, and information in the authorization request message may be sent to CBP 1780 for verification. An authorization response message is then sent back to transaction processing network 1784 to indicate whether the current transaction is authorized (or not authorized). Transaction processing network 1784 then forwards the authorization response message back to acquirer 1774. In some embodiments, transaction processing network 1084 may decline the transaction even if issuer or host processing system 1772 has authorized the transaction, for example depending on a value of a fraud risk score or depending if limited-use account parameters are verified by CBP 1780. Acquirer 1774 then sends the authorization response message to the merchant computer and/or access device 1760. The authorization response results may be displayed by access device 1760, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 1784. A clearing process is a process of exchanging financial details between an acquirer and an issuer to facilitate posting to a customer's payment account and reconciliation of the user's settlement position.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
receiving, by a primary device, credential data of a secondary device;
generating, by the primary device, a cryptogram using the credential data of the secondary device; and
transmitting, by the primary device, the cryptogram to an access device to request for authorization to use an account associated with a user of the primary device, wherein the primary device interacts with the access device without presence of the secondary device, and wherein the authorization is granted based on verification of the cryptogram and an interaction activity pattern of interactions between the primary device and a set of communication devices including the secondary device.

2. The method of claim 1, further comprising:
for each communication device in the set of communication devices:
establishing, by the primary device, a communication channel between the primary device and the communication device;
receiving, by the primary device, device data from the communication device including at least one of a device identifier identifying the communication device, sensor data sensed by the communication device, or user data captured by the communication device; and
sending, by the primary device, the device data received from the communication device to an authorization server, wherein the device data is used for establishing the interaction activity pattern.

3. The method of claim 2, wherein the interaction activity pattern is established further based on a time of day of when the primary device interacted with each communication device.

4. The method of claim 2, wherein the authorization is granted based on a comparison of the interaction activity pattern with recent interactions between the primary device and one or more of the communication devices.

5. The method of claim 1, wherein the credential data of the secondary device includes a device identifier of the secondary device, and the method further comprises:
deriving, by the primary device, a key-encryption key using the device identifier of the secondary device and a shared key stored on the primary device; and
decrypting, by the primary device, an encrypted cryptogram key using the derived key-encryption key, wherein generating the cryptogam includes encrypting data pertaining to the request for authorization using the decrypted cryptogram key.

6. The method of claim 5, further comprising:
prior to receiving the credential data of the secondary device:

sending the device identifier of the secondary device to an authorization server to register the secondary device;

in response to registering the secondary device, receiving the shared key and the encrypted cryptogram key from the authorization server; and storing the shared key on the primary device.

7. The method of claim 6, further comprising storing the encrypted cryptogram key on the primary device.

8. The method of claim 6, further comprising:

forwarding the encrypted cryptogram key to the secondary device for storage on the secondary device; and receiving the encrypted cryptogram key from the secondary device as part of the credential data of the secondary device.

9. The method of claim 1, wherein the credential data of the secondary device is deleted from the primary device when a predetermined time period from receiving the credential data has elapsed.

10. The method of claim 1, further comprising:

determining, by the primary device, that the secondary device is not in presence of the primary device; and sending, by the primary device, a request to a remote server for the credential data of the secondary device, wherein the credential data of the secondary device is received by the primary device from the remote server.

11. The method of claim 1, further comprising:

generating, by the primary device, a first intermediate cryptogram using a first portion of a cryptogram key stored on the primary device; and transmitting, by the primary device, the first intermediate cryptogram to the secondary device, wherein the credential data of the secondary device received by the primary device is a second intermediate cryptogram generated by the secondary device using the first intermediate cryptogram and a second portion of the cryptogram key stored on the secondary device.

12. The method of claim 11, wherein the cryptogram is generated by the primary device using the second intermediate cryptogram and the first portion of the cryptogram key stored on the primary device.

13. The method of claim 11 wherein the first intermediate cryptogram is generated by encrypting data pertaining to the request for authorization using the first portion of the cryptogram key, decrypting the encrypted data using a first intermediate key, and re-encrypting the decrypted data using a second intermediate key.

14. The method of claim 13, wherein the second intermediate cryptogram is generated by decrypting the first intermediate cryptogram using the second intermediate key, re-encrypting the decrypted first intermediate cryptogram using the first intermediate key, decrypting the re-encrypted first intermediate cryptogram using the second portion of the cryptogram key.

15. The method of claim 14, wherein the second intermediate cryptogram is generated by further encrypting a result of decrypting the re-encrypted first intermediate cryptogram using the second intermediate key, and decrypting the encrypted result using first intermediate key.

16. The method of claim 15, wherein the cryptogram is generated by encrypting the second intermediate cryptogram using the first intermediate key, decrypting the encrypted second intermediate cryptogram using the second intermediate key, and re-encrypting the decrypted second intermediate cryptogram using the first portion of the cryptogram key.

17. The method of claim 1, wherein the request for authorization is initiated from a tertiary device acting as a user interface device that is communicatively coupled to the primary device.

18. A communication device comprising:

a processor; and a memory storing computer readable instructions, which when executed by the processor, cause the communication device to perform operations including:

receiving credential data of a secondary device;

generating a cryptogram using the credential data of the secondary device; and transmitting the cryptogram to an access device to request for authorization to use an account associated with a user of the communication device, wherein the communication device interacts with the access device without presence of the secondary device, and wherein the authorization is granted based on verification of the cryptogram and an interaction activity pattern of interactions between the communication device and a set of user devices including the secondary device.

19. The communication device of claim 18, wherein the communication device is a portable communication device or a network-connected communication device.

* * * * *